(12) United States Patent
Chou et al.

(10) Patent No.: US 12,192,052 B2
(45) Date of Patent: Jan. 7, 2025

(54) END-TO-END RADIO ACCESS NETWORK (RAN) DEPLOYMENT IN OPEN RAN (O-RAN)

(71) Applicant: Apple Inc., Cupertino, CA (US)

(72) Inventors: Joey Chou, Cupertino, CA (US); Niall Power, Cupertino, CA (US); Jianli Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 275 days.

(21) Appl. No.: 17/441,515

(22) PCT Filed: Jun. 10, 2020

(86) PCT No.: PCT/US2020/037036
§ 371 (c)(1),
(2) Date: Sep. 21, 2021

(87) PCT Pub. No.: WO2020/252052
PCT Pub. Date: Dec. 17, 2020

(65) Prior Publication Data
US 2022/0158897 A1    May 19, 2022

Related U.S. Application Data

(60) Provisional application No. 62/859,559, filed on Jun. 10, 2019.

(51) Int. Cl.
*H04L 41/082* (2022.01)
*H04W 24/02* (2009.01)

(52) U.S. Cl.
CPC ........... *H04L 41/082* (2013.01); *H04W 24/02* (2013.01)

(58) Field of Classification Search
CPC ............................. H04L 41/082; H04W 24/02
See application file for complete search history.

(56) References Cited

U.S. PATENT DOCUMENTS

10,116,571 B1 * 10/2018 Bertz .................... H04L 67/131
11,928,522 B2 * 3/2024 Xia ....................... G06F 9/5077
(Continued)

FOREIGN PATENT DOCUMENTS

CN      106797325      5/2017
CN      107005436      8/2017
(Continued)

OTHER PUBLICATIONS

[No Author Listed], "3rd Generation Partnership Project; Technical Specification Group Services and System Aspects; Telecommunication management; Study on network management of virtualized networks (Release 13)," 3GPP TR 32.842, V1.1.0, May 2015, 57 pages.

(Continued)

*Primary Examiner* — Parth Patel
(74) *Attorney, Agent, or Firm* — Fish & Richardson P.C.

(57) ABSTRACT

Methods, systems, and computer programs for configuring a network functions virtualization orchestrator (NFVO). In one aspect, a method can include actions of generating, by one or more computers, a message that includes data representing a request to upload a virtual network function (VNF) package, encoding, by the one or more computers, the generated message that includes the VNF package for transmission to a network functions virtualization orchestrator (NFVO), and transmitting, by the one or more computers, the encoded message to the NFVO.

18 Claims, 17 Drawing Sheets

(56) References Cited

U.S. PATENT DOCUMENTS

| | | | |
|---|---|---|---|
| 2016/0226663 A1* | 8/2016 | Jones | G06F 21/121 |
| 2016/0328259 A1 | 11/2016 | Xia et al. | |
| 2016/0381150 A1* | 12/2016 | Rajagopal | H04L 41/40 |
| | | | 709/223 |
| 2017/0346831 A1 | 11/2017 | Liu | |
| 2017/0373939 A1* | 12/2017 | Liu | H04L 63/08 |
| 2018/0131557 A1 | 5/2018 | Chou et al. | |
| 2018/0324261 A1* | 11/2018 | Yi | H04L 67/51 |
| 2019/0042481 A1* | 2/2019 | Feghali | H04L 9/0894 |
| 2019/0044669 A1* | 2/2019 | Davydov | H04L 5/005 |
| 2019/0053226 A1* | 2/2019 | Xiong | H04L 1/08 |
| 2019/0138934 A1* | 5/2019 | Prakash | G06F 9/5072 |
| 2019/0149434 A1 | 5/2019 | Chou et al. | |
| 2019/0246454 A1* | 8/2019 | Niu | H04W 56/001 |
| 2019/0253264 A1* | 8/2019 | Singaravelu | H04L 41/28 |
| 2019/0357084 A1* | 11/2019 | Chou | H04L 41/0806 |
| 2020/0014582 A1* | 1/2020 | Chou | H04L 41/0895 |
| 2020/0068391 A1* | 2/2020 | Liu | H04L 63/162 |
| 2020/0213226 A1* | 7/2020 | Zheng | H04L 45/036 |
| 2020/0302051 A1* | 9/2020 | Li | H04L 9/0825 |
| 2020/0336258 A1* | 10/2020 | Zhu | H04L 1/1642 |
| 2020/0409743 A1* | 12/2020 | Ni | H04L 41/5009 |
| 2020/0412805 A1* | 12/2020 | Osawa | H04L 45/34 |
| 2021/0028923 A1* | 1/2021 | Ryou | H04L 9/3239 |
| 2021/0200599 A1* | 7/2021 | Segura Cava | G06F 9/5077 |
| 2021/0314262 A1* | 10/2021 | Nishiyama | H04L 49/90 |
| 2022/0158897 A1* | 5/2022 | Chou | H04L 41/082 |
| 2022/0173834 A1* | 6/2022 | Vidal | H04L 1/0041 |
| 2022/0210736 A1* | 6/2022 | Ye | H04W 72/1273 |

FOREIGN PATENT DOCUMENTS

| | | |
|---|---|---|
| CN | 108370331 | 8/2018 |
| WO | WO 2016/048430 | 3/2016 |
| WO | WO 2018/031057 | 2/2018 |
| WO | WO-2018045540 A1 * | 3/2018 |
| WO | WO 2019/027827 | 2/2019 |

OTHER PUBLICATIONS

[No Author Listed], "3rd Generation Partnership Project; Technical Specification Group Services and System Aspects; Management and orchestration; 5G Network Resource Model (NRM); Stage 1 (Release 16)," 3GPP TS 28.540 V16.0.0, Jun. 2019, 10 pages.

[No Author Listed], "3rd Generation Partnership Project; Technical Specification Group Services and System Aspects; Management and orchestration; Architecture framework (Release 15)," 3GPP TS 28.533 V15.1.0, Dec. 2018, 25 pages.

[No Author Listed], "Network Functions Virtualization (NFV); Management and Orchestration," ETSI GS NFV-MAN 001 V1.1.1, Dec. 2014, 184 pages.

[No Author Listed], "Network Functions Virtualization (NFV); Management and Orchestration; Os-Ma-Nfvo reference point—Interface and Information Model Specification," ETSI GS NFV-IFA 013, V2.1.1, Oct. 2016, 127 pages.

International Preliminary Report on Patentability in International Appln. PCT/US2020/037036, mailed Dec. 23, 2021, 16 pages.

International Search Report and Written Opinion in International Appln. No. PCT/US2020/037036, mailed Oct. 22, 2020, 24 pages.

Invitation to Pay Additional Fees in International Appln. No. PCT/US2020/037036, mailed Aug. 31, 2020, 20 pages.

* cited by examiner

700

```
@startuml
Autonumber
Skinparam sequenceArrowThickness 2

Box "Orchestration and Management Platform" #gold
    participant SMO as "Orchestration"
end box Box "Cloud Platform" #lightseagreen
    participant IMF
End box
```

700A

```
== VNF package uploads ==
SMO -> IMF  : <<01*>> Upload a VNF package with VNFD #1 for O-DU-1
 IMF -> SMO : VNF package upload is successful
SMO -> IMF  : <<01*>> Upload a VNF package with VNFD #2 for O-DU-2
 IMF -> SMO : VNF package upload is successful
SMO -> IMF  : <<01*>> Upload a VNF package with VNFD #3 for O-CU-UP-1
 IMF -> SMO : VNF package upload is successful
SMO -> IMF  : <<01*>> Upload a VNF package with VNFD #4 for O-CU-UP-2
 IMF -> SMO : VNF package upload is successful
SMO -> IMF  : <<01*>> Upload a VNF package with VNFD #5 for O-CU-CP
 IMF -> SMO : VNF package upload is successful
```

700B

```
== PNFD uploads ==
SMO -> IMF  : <<01*>> Upload the PNFD with pnfd#1 for 0-RU-1
 IMF -> SMO : PNFD upload is successful
SMO -> IMF  : <<01*>> Upload the PNFD with pnfd#2 for 0-RU-2
 IMF -> SMO : PNFD upload is successful
```

700C

```
== NSD update ==
SMO -> IMF  : <<01*>> Update the NSD with the new VNF packages containing\n VNFD#1 - #7
 and PNFD with pnfd#1 - #2
 IMF -> SMO : NFD update is successful SMO -> IMF  : <<01*>> Update the NS identified by nsInstanceId #1 with the updated NSD
 IMF -> SMO : Send the NS lifecycle change notification indicating start of NS update
activate IMF
note right IMF
NFVO works with VNFM, VIM
to update a NS instance to
indicude new VNFs and PNFs
End note
 IMF -> SMO : Send the NS lifecycle change notification indicating a NS instance \n
identified by nsInstanceId#1 has been updated @enduml
```

FIG. 7

END-TO-END RADIO ACCESS NETWORK (RAN) DEPLOYMENT IN OPEN RAN (O-RAN)

CROSS-REFERENCE TO RELATED PATENT APPLICATIONS

The present application is a U.S. National Phase application under 35 U.S.C. § 371 of International Patent Application No. PCT/US2020/037036, filed on Jun. 10, 2020, which claims the benefit of U.S. Provisional Patent Application No. 62/859,559 filed Jun. 10, 2019, the disclosures of each of which are incorporated herein by reference in their entirety.

BACKGROUND

Various implementations generally may relate to the field of wireless communications.

SUMMARY

Even as the investment required to deploy next generation networks such as 5G network become increasingly more expensive in an effort to satisfy increasing capacity demand, the monthly fee each mobile subscriber pays has more or less remained the same. As a result, mobile operators can be pressured to find ways to cut costs. The advent of software defined networks (SDN) and network functions virtualization (NFV) enables building a more agile, less expensive core network.

The radio access network (RAN) represents about 65-70% of the total cost of ownership of a network in building and operation. Therefore, organizations, like the Open RAN (O-RAN) alliance, have been formed to open the RAN architecture with standard interfaces to enable multi-vendor deployments and a more competitive and vibrant supplier ecosystem. Moreover, O-RAN intends to add more intelligence to the RAN node, by defining the RAN Intelligent Controller (RIC), to automate network operations network and reduce OPEX.

Accordingly, some implementations of the present disclosure are directed to end-to-end RAN deployment in O-RAN. Among other things, end-to-end RAN deployment using virtual network functions (VNF) and physical network functions (PNF) enables operators to deploy O-DU, O-CU-UP, O-CU-CP, AMF, and UPF, where the O-DU is connected to O-RU. Such deployments significantly reduce deployment costs over conventional methods.

According to one innovative aspect of the present disclosure, a method for configuring a network functions virtualization orchestrator (NFVO) is disclosed. In one aspect, the method can include generating, by one or more computers, a message that includes data representing a request to upload a virtual network function (VNF) package, encoding, by the one or more computers, the generated message that includes the VNF package for transmission to a network functions virtualization orchestrator (NFVO), and transmitting, by the one or more computers, the encoded message to the NFVO.

Other versions include corresponding systems, apparatus, and computer programs to perform the actions of methods defined by instructions encoded on computer readable storage devices.

These and other versions may optionally include one or more of the following features. For instance, in some implementations, the NFVO is a component of an infrastructure management framework (IMFW).

In some implementations, the method can further include receiving a message from the NFVO after transmission of the encoded message, wherein the received message includes data indicating that the VNF package has been uploaded successfully to the NFVO.

In some implementations, the generated message that includes the request to upload the VNF package includes an identifier of a VNF.

In some implementations, the generated message that includes the request to upload the VNF package includes an identifier of a physical network function (PNF).

In some implementations, one or more of (i) generating the message that includes the request to upload the VNF, (ii) encoding the generated message that includes the VNF package for transmission to the network functions virtualization orchestrator (NFVO), or (iii) transmitting the encoded message to the NVFO are performed using a service management and orchestration framework (SMOFW).

According to another innovative aspect of the present disclosure, a method is disclosed that includes generating, by an apparatus of a service management and orchestration framework (SMOFW), a first request message that includes data representing a request to upload a virtual network function (VNF) package, transmitting, by the apparatus of the SMOFW, the generated first request message to a network functions virtualization orchestrator (NFVO), receiving, by the apparatus of the SMOFW, a first response message from the NFVO, the first response message including data indicating that the VNF package upload was successful, generating, by the apparatus of the SMOFW, a second request message that includes data representing a request to upload a physical network function (PNF) Descriptor (PNFD), transmitting, by the apparatus of the SMOFW, the generated second request message to the NFVO, and receiving, by the apparatus of the SMOFW, a second response message from the NFVO, the second response message including data indicating that the PNFD upload was successful.

Other versions include corresponding systems, apparatus, and computer programs to perform the actions of methods defined by instructions encoded on computer readable storage devices.

These and other versions may optionally include one or more of the following features. For instance, in some implementations, the method can further include generating, by the apparatus of the SMOFW, a third request message that includes data representing request to update to a network service descriptor (NSD) associated with the VNF packages and the PNFD that were previously uploaded, transmitting, by the apparatus of the SMOFW, the generated third request message to the NFVO, receiving, by the apparatus of the SMOFW, a third response message from NFVO, the third response message including data indicating the NSD update was successful.

In some implementations, the method can further include generating, by the apparatus of the SMOFW, a fourth request message that includes data representing a request to update a network service (NS) instance associated with the updated NSD, transmitting, by the apparatus of the SMOFW, the generated fourth request message to the NFVO, receiving, by the apparatus of the SMOFW, a fourth response message from the NFVO, where the fourth response message includes data indicating that the NS instance update has been started, and receiving, by the apparatus of the SMOFW, a fifth response message from the NFVO, wherein the fifth response message includes data indicating a result of the NS instance update.

In some implementations, the result of the NS instance update includes (i) data indicating that the NS instance update was successful or (ii) data indicating that the NS instance update was not successful.

In some implementations, the VNF package can include a one or more of a VNF for O-CU-CP, a VNF for O-CU-UP, or a VNF for O-DU.

In some implementations, the VNF package includes a VNF descriptor for each VNF of the VNF package.

In some implementations, the apparatus of the SMOFW includes one or more computers.

These and other aspects of the present disclosure are discussed in more detail in the detailed description below with reference to the accompanying drawings.

BRIEF DESCRIPTION OF THE DRAWINGS

FIG. 7 illustrates a flowchart of an example of a process for configuring a network functions virtualization orchestrator (NFVO).

DETAILED DESCRIPTION

In one aspect, the present disclosure is directed to the end-to-end RAN deployment in O-RAN. Among other things, end-to-end RAN deployment with virtual network function (VNF) and physical network function (PNF) enables operators to deploy O-DU, O-CU-UP, O-CU-CP, AMF, and UPF, where the O-DU is connected to O-RU.

Figure 1:
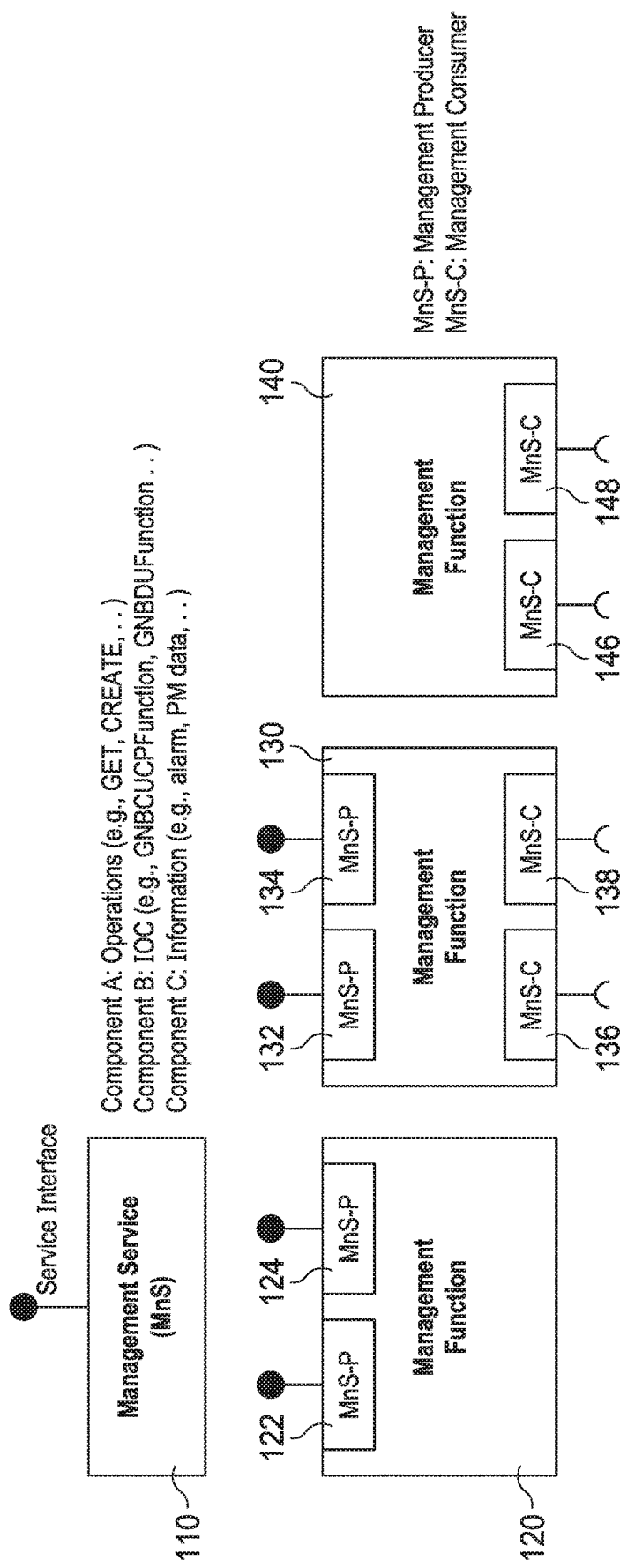
FIG. 1 illustrates an example of a diagram of a service based architecture (SBA).

FIG. 1 illustrates an example of a diagram of a service based architecture (SBA). In this example, the SBA is presented as defined by 3GPP TS 28.533. However, other service based architectures can fall within the scope of the present disclosure.

A service based architecture can include a management service (MnS) 110 and management functions (MnF) 120, 130, 140. Management services (MnS) can offer capabilities for management and orchestration of network and services. In some implementations, the management service can include a MnS producer and a MnS consumer. An MnS producer is an entity that produces an MnS. An MnS consumer is an entity that consumes an MnS. A MnS produced by an entity can be consumed by any entity having authorized and authenticated to use the service.

A Management Function (MnF) 120, 130, 140 can be a management entity whose externally-observable behaviour and interfaces are specified by, for example, 3GPP as management services. In a SBA, an MnF can be defined using a role of a MnS consumer, MnS producer, or both MnS consumer and producer. By way of example, an MnF 120 can be defined as an MnS producer 122, 124, an MnF 130 can be defined as both an MnS consumer 136, 137 and an MnS producer 132, 134, and an MnF 140 can be defined as an MnS consumer 146, 148.

Figure 2:
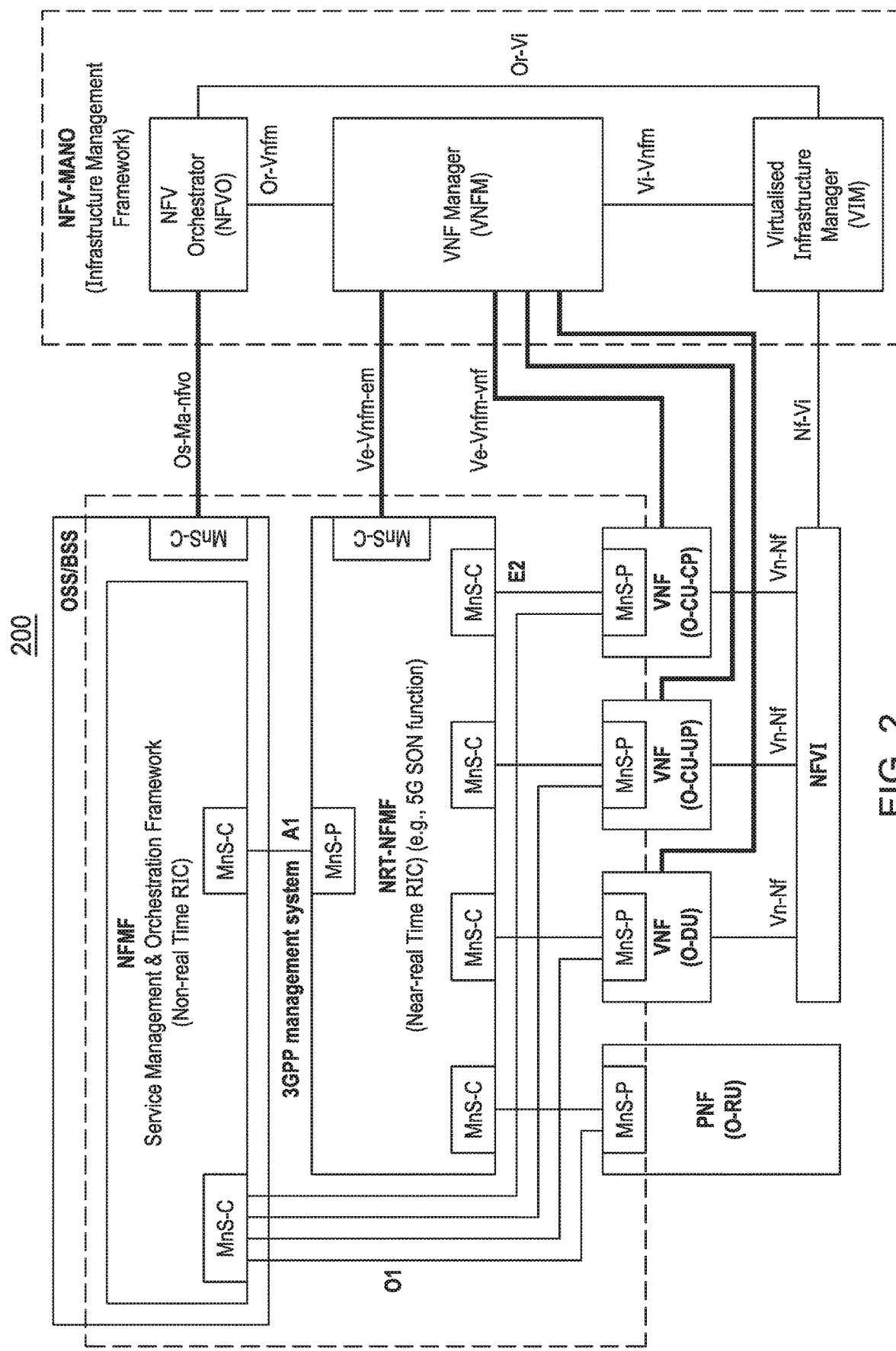
FIG. 2 illustrates an example of a diagram of a mapping between a 3GPP management system, NFV-MANO and O-RAN with managed O-RU.
Figure 3:
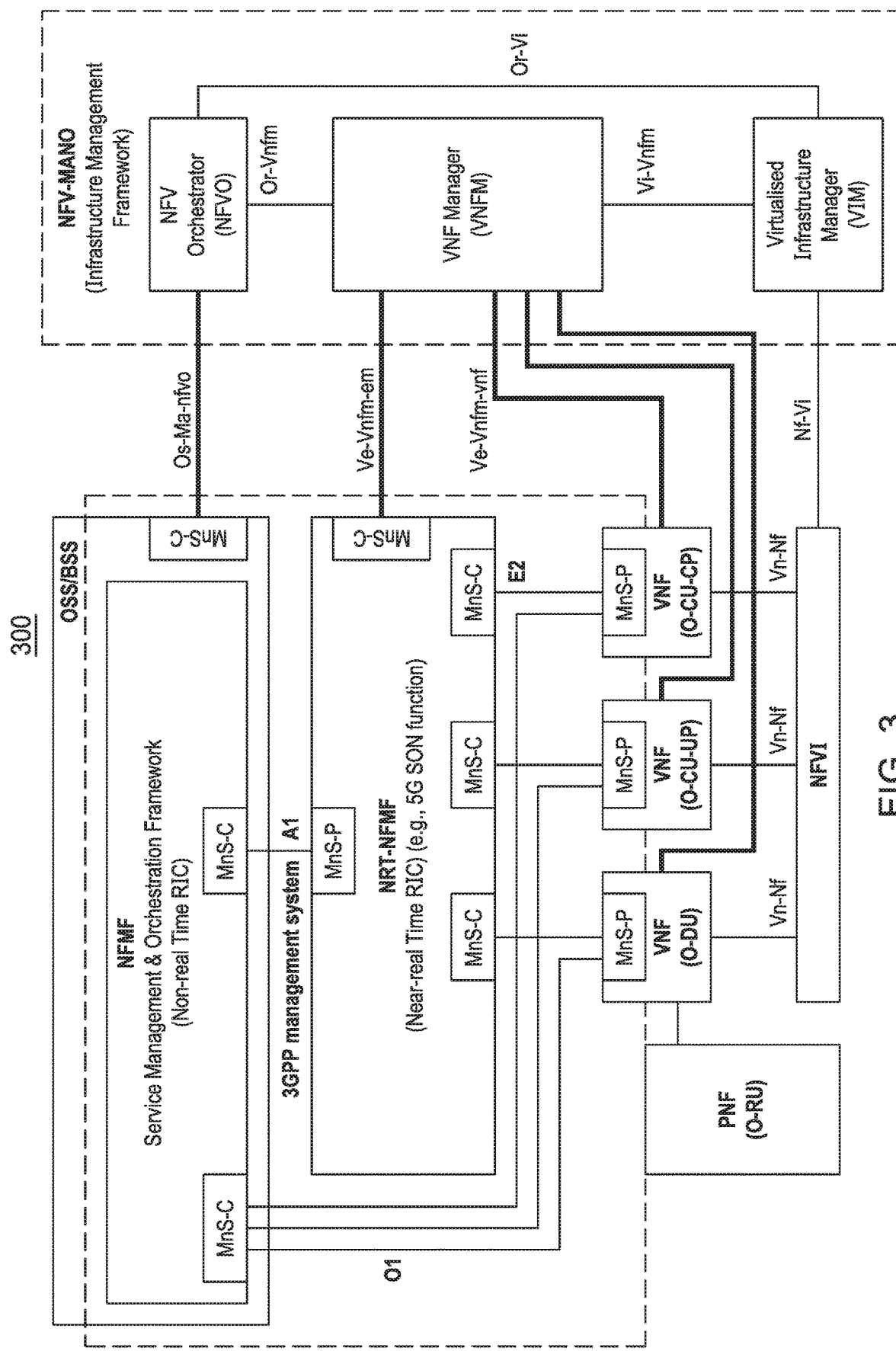
FIG. 3 illustrates an example of a diagram of a mapping between 3GPP management system, NFV-MANO and O-RAN.

FIG. 2 illustrates an example of a diagram of a system 200 mapping between a 3GPP management system, NFV-MANO and O-RAN with managed O-RU. In the example of FIG. 2, the mapping is based on 5G SBA. As shown in FIG. 2, the Service Management and Orchestration Framework and Non-real Time RIC (RAN Intelligent Controller) can be implemented as the NFMF (Network Function Management Function). Near-real Time RIC can be implemented as the NRTNFMF (Near Real Time Network Function Management Function) that support 5G SON functions with near real-time requirements. By way of another example, the Infrastructure Management Framework can be implemented as the ETSI NFV-MANO as shown in FIG. 3, which depicts a system 300 mapping between 3GPP management system, NFV-MANO and O-RAN, where the O-RU is managed via the pro13 of O-CU.

Figure 8A:
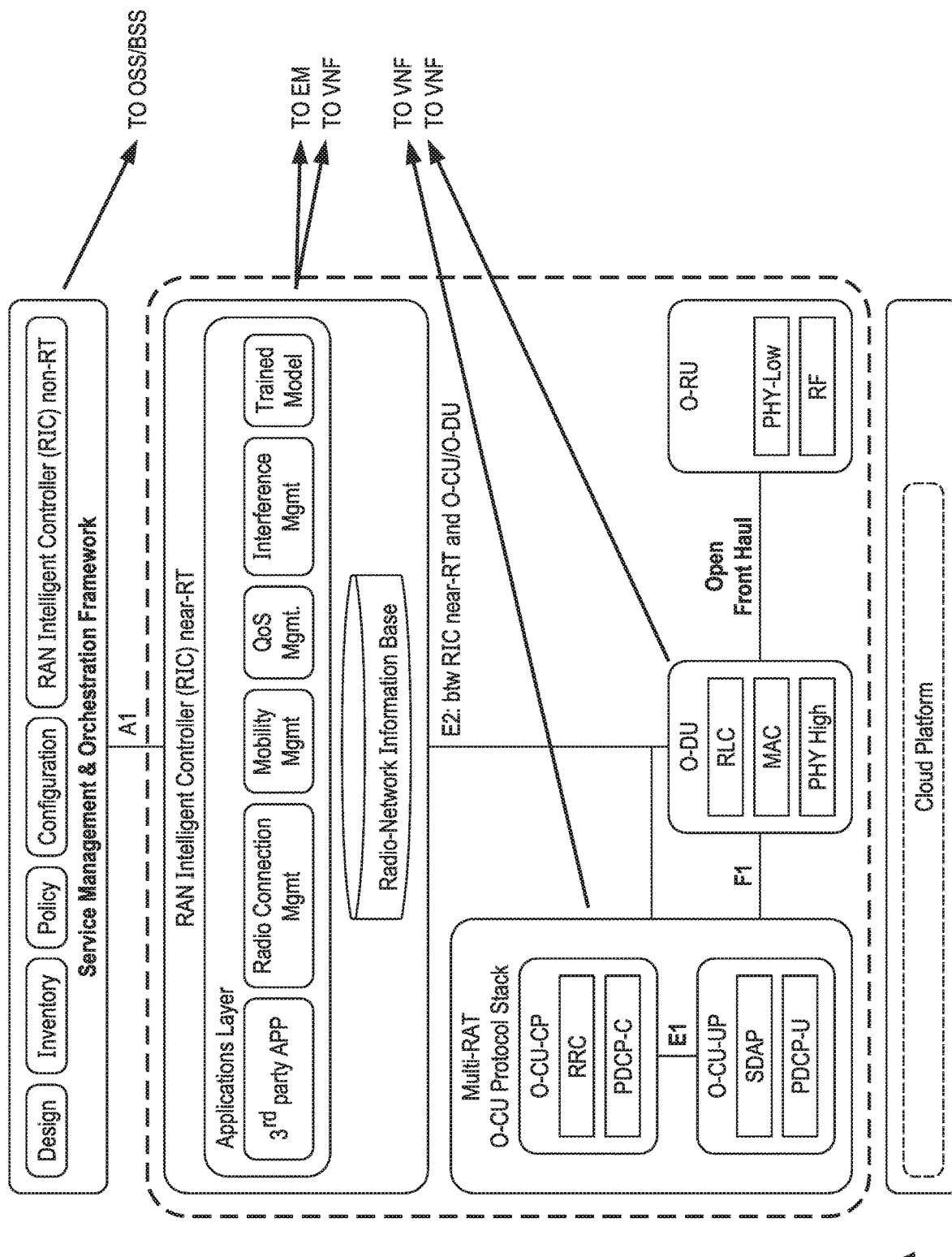
FIG. 8A illustrates example of a mapping of an O-RAN with the ETSI NFV MANO architecture.
Figure 8A:
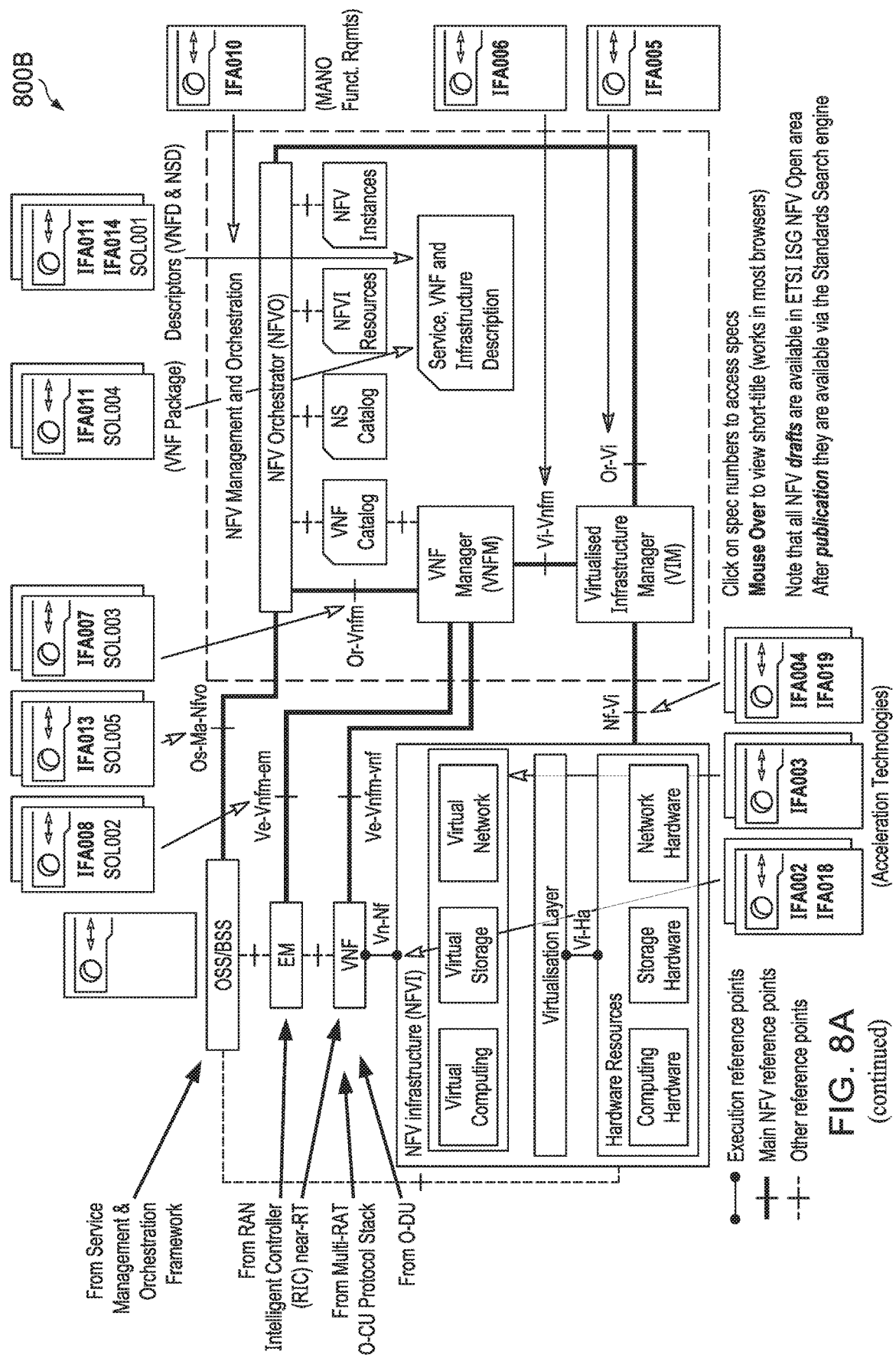
Figure 8B:
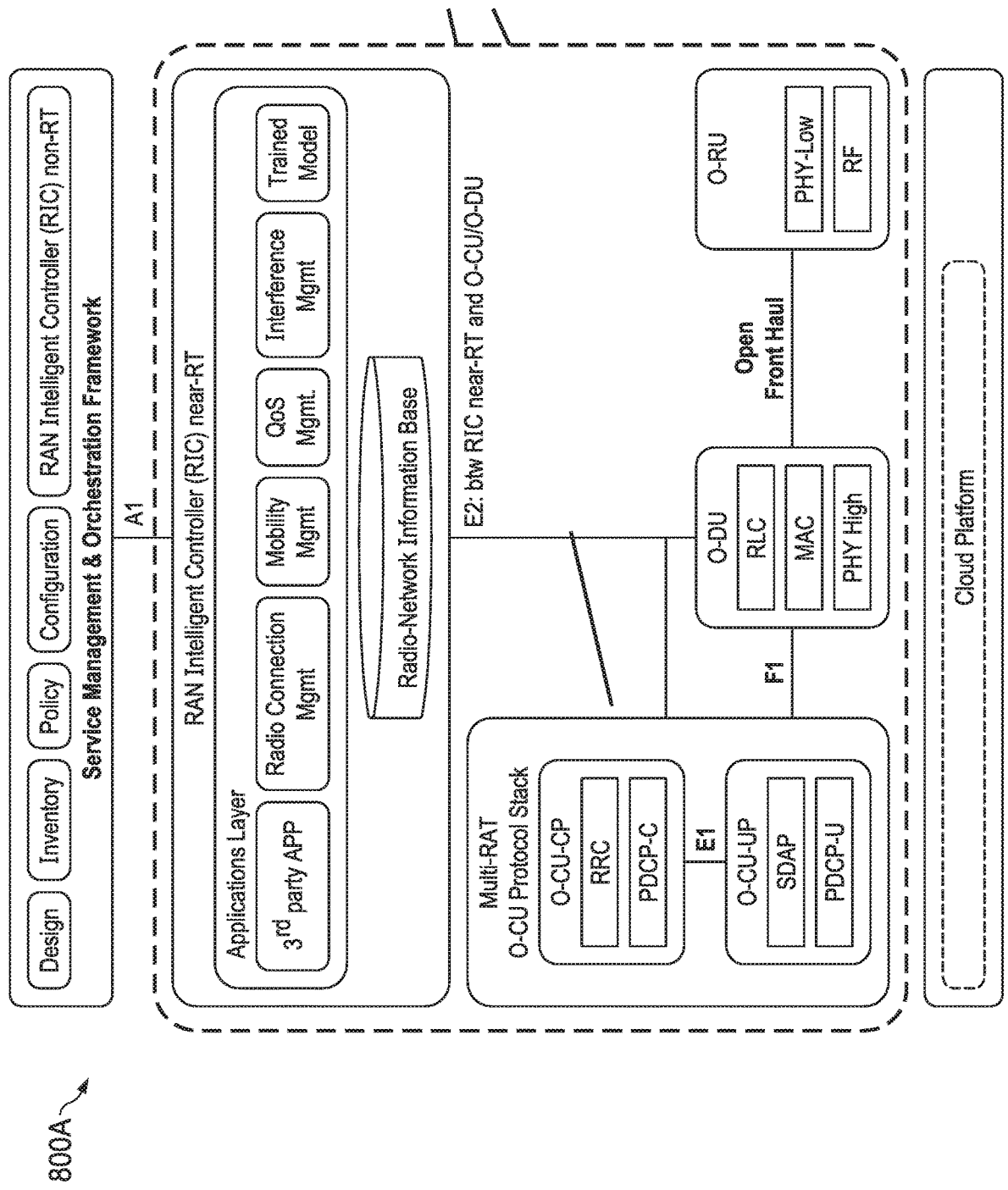
FIG. 8B illustrates an example of an O-RAN architecture.
Figure 8C:
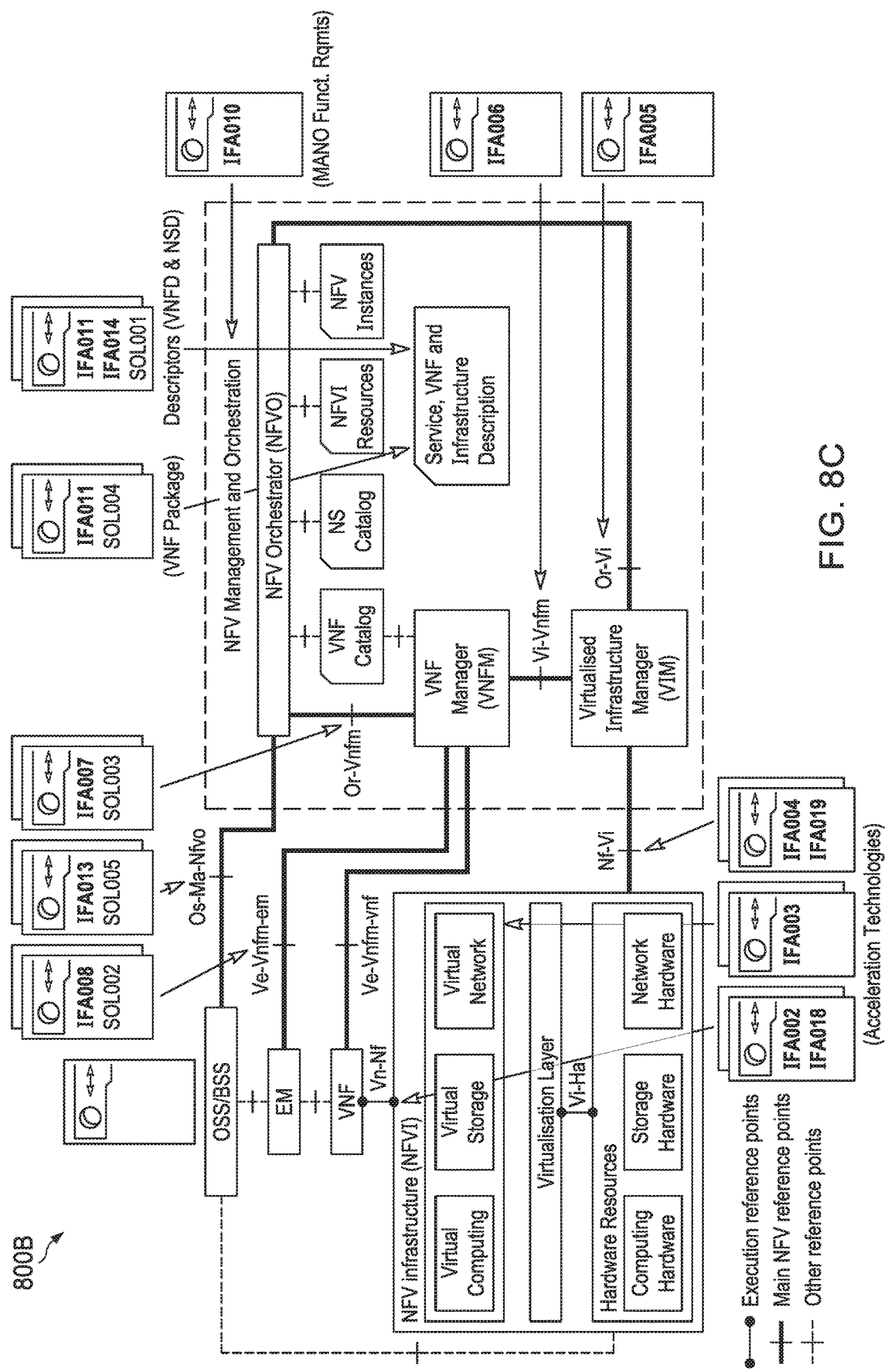
FIG. 8C illustrates an example of an ETSI NFV MANO architecture.

Another example of a mapping of an O-RAN 800A with an ETSI NFV MANO architecture 800B is depicted in the system 800 of FIG. 8A. An exploded view of the O-RAN 800A of FIG. 8A is shown in FIG. 8B. Likewise, an exploded view of the ETSI NFV MANO architecture 800B of FIG. 8A is shown in FIG. 8C.

5.1 End-to-End RAN Deployment with PNF and VNF

Figure 4:
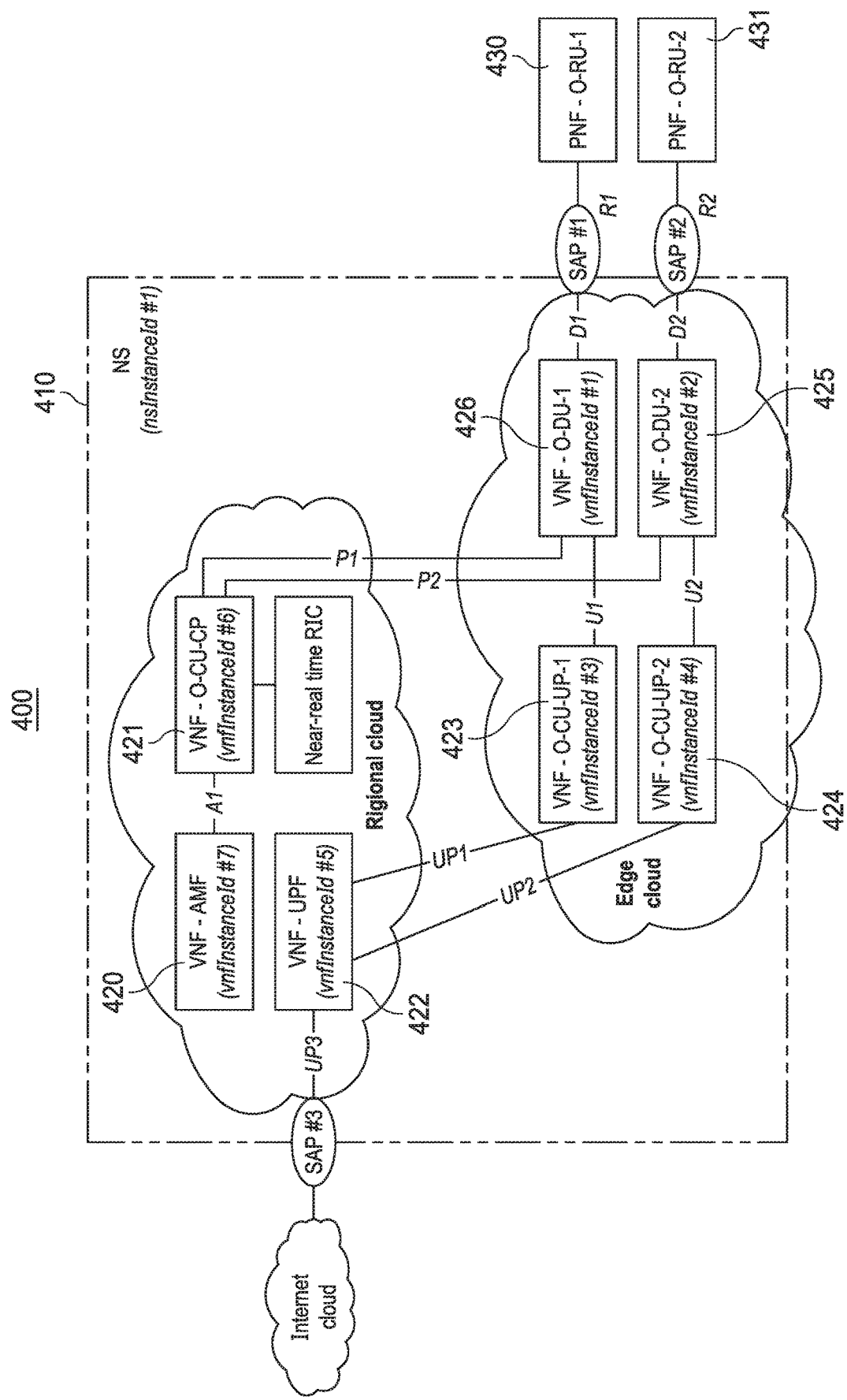
FIG. 4 illustrates an example of an end-to-end 5G network that can be initiated as a Network Service (NS).

FIG. 4 illustrates an example of an end-to-end 5G network 400 that can be initiated as a Network Service (NS). In some implementations, such a system can be instantiated us a network service (NS) 410. In some implementations, this can be achieved by using aspects of the present disclosure to configure one or more of VNFs 420, 421, 422, 423, 424, 425, 426, one or more of PNFs 430, 431, or a combination thereof.

5.2 Entities/Resources Involved

A number of entities or resources can be used to achieve configuration of the network 400 as a network service 410. For example, in some implementations, these entities or services can include one or more of a service management and orchestration framework (SMOFW), an infrastructure management framework (IMFW), one or more physical network functions (PNFs) such as O-RU-1 and O-RU-2, one or more virtual network functions (VNFs) such as O-DU-1, O-DU-2, O-CU-UP-1, O-CU-UP-2, O-CU-CP, AMF, and UPF, or any combination thereof. In some implementations, configuration of the network 400 can be achieved using virtual network functions (VNF) packages. In some implementations, a VNF package can include data identifying one or more VNFs specified for configuration.

5.3 Example of Configuring NVFO

Figure 5:
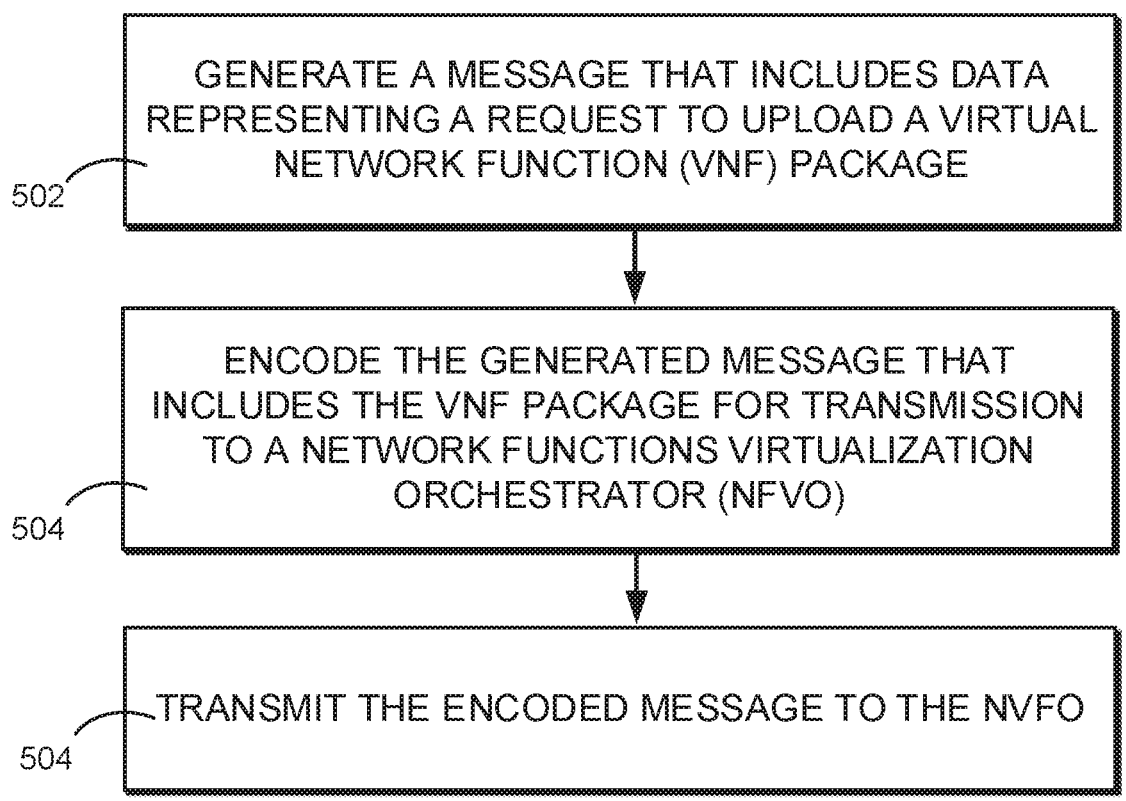
FIG. 5 illustrates a flowchart of an example of a process for configuring a network functions virtualization orchestrator (NFVO).

FIG. 5 illustrates a flowchart of an example of a process 500 for configuring a network functions virtualization orchestrator (NFVO). In general, the process 500 can include use of a one or more computers to generate a message that includes data representing a request to upload a virtual network function (VNF) package (502), encode the generated message that includes the VNF package for transmission to a network functions virtualization orchestrator (NFVO) (504), and transmit the encoded message to the NVFO (506). In some implementations, the NFVO can be a component of an infrastructure management framework (IMFW). In some implementations, one or more of (i) generating the message that includes the request to upload the VNF, (ii) encoding the generated message that includes the VNF package for transmission to the network functions virtualization orchestrator (NFVO), or (iii) transmitting the encoded message to the NVFO are performed using a service management and orchestration framework (SMOFW).

In some implementations, after receipt and processing of the message that includes the VNF package, the one or more computers that generated and transmitted the encoded message with the VNF package can receive a message from the NFVO after transmission of the encoded message. In such implementations, the received message include data indicating that the VNF package has been uploaded successfully to the NFVO.

The one or more computers can also include in the same generated message of stage 502 or a different, and subsequent, message data representing a request upload a VNF package includes an identifier of a physical network function (PNF), thereby enabling configuration of both VNFs and PNFs.

5.3 Sequence Description

Figure 6:
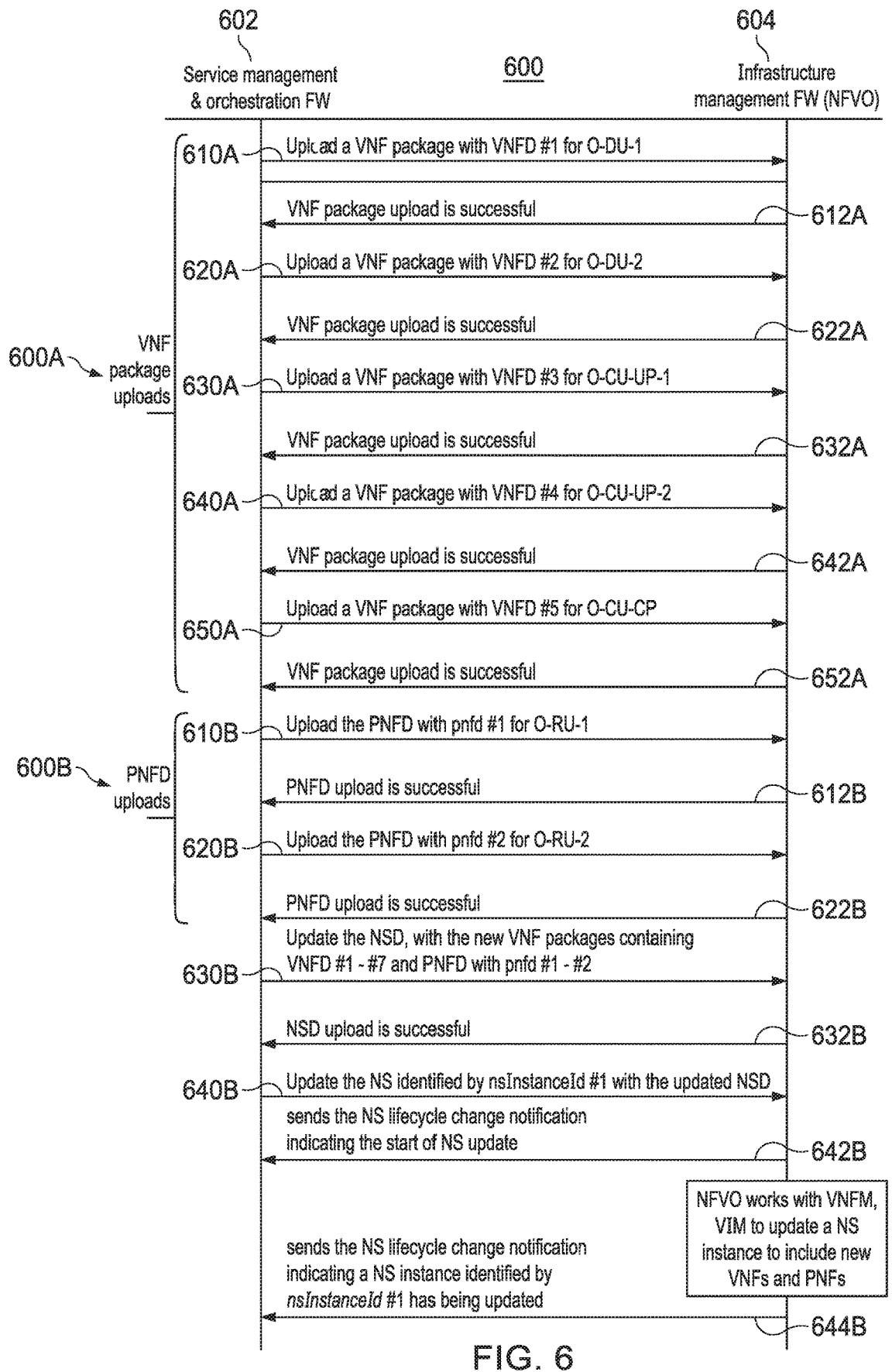
FIG. 6 illustrates a flow diagram of an example of a process flow for configuring a network functions virtualization orchestrator (NFVO).

FIG. 6 illustrates a flow diagram of an example of a process flow 600 for configuring a network functions virtualization orchestrator (NFVO). In the example of FIG. 6, it is assumed that a NS instance identified nsInstanceId #1 with AMF VNF vnfInstanceId #7 and UPF VNF vnfInstanceId #8, based on nsdInfo #1, has been instantiated. In addition, the example of FIG. 6 also assumes that O-RU has O1 interface to SMOFW. However, the scope of the present disclosure should not be limited to these examples.

The process flow 600 describes a series of messages exchanged between a service management and orchestration FW 602 and an infrastructure management FW (NFVO) 604. A first portion of the process calls and responses are directed towards VNF package uploads 600A and a second portion of the process calls and responses are directed towards PNFD uploads 600B. The remaining process calls relate to, for example, one or more NSD updates.

The process flow 600 begins with an SMOFW requesting network functions virtualization orchestration (NFVO) in IMFW to upload the VNF package vnfPkgInfo with VNFD #1 for O-DU-1 (ETSI GS NFV-IFA 013 [6]) (610A). The process flow 600 continues with the NFVO in IMFW responding to indicate the VNF package has been uploaded successfully (612A). The process flow 600 continues with the SMOFW requesting NFVO in IMFW to upload the VNF package vnfPkgInfo with VNFD #2 for O-DU-2 (ETSI GS NFV-IFA 013 [6]) (620A). The process flow 600 continues with the NFVO in IMFW responding to indicate the VNF package has been uploaded successfully (622A). The process flow 600 continues in with the SMOFW requesting NFVO in IMFW to upload the VNF package vnfPkgInfo with VNFD #3 for O-CU-UP-1 (630A). The process flow 600 continues with the NFVO in IMFW responds to indicate the VNF package has been uploaded successfully (632A). The process flow 600 continues with the SMOFW requesting NFVO in IMFW to upload the VNF package vnfPkgInfo with VNFD #4 for O-CU-UP-2 (640A). The process flow 600 continues with the NFVO in IMFW responding to indicate the VNF package has been uploaded successfully (642A). The process flow 600 continues with the SMOFW requesting NFVO in IMFW to upload the VNF package vnfPkgInfo with VNFD #5 for O-CU-CP (650A). The process flow 600 continues with the NFVO in IMFW responding to indicate the VNF package has been uploaded successfully (652A).

In some implementations, the process flow 600 can continue with the SMOFW requesting NFVO in IMFW to upload the PNFD pnfd #1 for O-RU-1 (610B). The process flow 600 can continue with the NFVO in IMFW responding to indicate the PNFD has been uploaded successfully (612B). The process flow 600 can continue with the SMOFW requests NFVO in IMFW to upload the PNFD pnfd #2 for O-RU-2 (620B). The process flow 600 can continue with the NFVO in IMFW responding to indicate the PNFD has been uploaded successfully (622B).

In some implementations, the process flow 600 can continue with the SMOFW requesting NFVO in IMFW to update (630B) the NSD identified by nsdInfo #1 that include the following information:
  vnfPkgInfo for O-DU-1, O-DU-2, O-CU-UP-1, O-CU-UP-2, and O-CU-CP VNFs.
  pnfdInfo for O-RU-1 and O-RU-2 PNFs.
  NSD that contains the following information:
    NsVirtualLinkDesc that defines the latency requirements of NS virtual links, such as D1/2, U1/2, P1/2, UP1/2/3, and A1
    vnfprofile for O-DU-1, O-DU-2, O-CU-UP-1, O-CU-UP-2, and O-CU-CP VNFs that contains nsVirtualLinkConnectivity attribute to show the connection of a VNF to the NS virtual link. For example, O-DU-2 VNF to the NS virtual link D2.
    Pnfprofile for O-RU-1 and O-RU-2 PNFs that contains pnfVirtualLinkConnectivity attribute to show the connection of a PNF to the NS virtual link. For example, O-RU-2 PNF to the NS virtual link D2.

The process flow 600 can continue with the NFVO in IMFW responding to indicate the NSD has been updated successfully (632B). The process flow 600 can continue with the SMOFW requesting NFVO in IMFW to update the NS instance identified nsInstanceId #1 by instantiating the new VNFs according to the NSD that was updated (640B). The process flow 600 can continue with the NFVO in IMFW sending the NS lifecycle change notification indicating the start of NS update (642. The NFVO in IMFW can update the NS and instantiate the VNF instances according to the NSD (644B). The process flow 600 can continue with the NFVO in IMFW sends the NS Lifecycle Change notification indicating the result of NS update (646B).

In the example of the process flow 600, each of the requests for upload or updating were performed successfully. However, it also falls within the present scope of the present disclosure that one or more of these requests for uploads or updates could fail. In such instances, a message can be sent from the NVFO to the SMOFW communicating from the NVFO to the SMOFW that the upload or update has failed. In such instances, multiple options can be followed for proceeding. For example, the upload or update process can be terminated, the upload or update process can be automatically restarted and attempted again, the upload or update process could be programmed to occur at a predetermined time in the future, or the like.

In addition, the example of the process flow 600 describes the process for communication between the SMOFW and the NVFO. It is noted that the process call of an request or update by the SMOFW includes the generation of an electronic message that includes data represented by each of the process calls. Execution of the process call by the SMOFW can include, for example, encoding of the generated message and transmission of the generated message to the NFVO using one or more communications media. Likewise, messages from the NVFO to the SMOFW communication the result of an upload or update can similarity be generated, encode, and transmitted across one or more communications media to facilitate communications sequence described in the process flow 600.

In some implementations, an NSD update may include adding VNF packages for one or more new VNFs, adding VNF packages for one or more PNF descriptors for the new PDFs, or adding VNF packages for one or more NS virtual link descriptors. In some implementations, the NS virtual link descriptors can include the VNF profile and PNF profiles. In some implementations, the VNF profile can contain the nsVirtualLinkConnectivity attribute to show the connection of a VNF to the NS virtual link. For example, O-DU VNF to the NS virtual link D2. In some implementations, the PNF profile may contain the pnfVirtualLinkConnectivity attribute to show the connection of a PNF to the NS virtual link. For example, O-RU VNF to the NS virtual link D2.

In some implementations, a Service Management and Orchestration Framework can be implemented as an NFMF (Network Function Management Function). In some implementations, the Near-real Time RIC can be implemented as the NRTNFMF (Near Real Time Network Function Management Function) that support 5G SON functions with near real-time requirements.

In some implementations, the Infrastructure Management Framework can be implemented as the ETSI NFV-MANO. In some implementations, the NFVO in IMFW updates the NS and instantiates the VNF instances according to the NSD.

5.4 UML Sequence Diagrams (PlantUML)

FIG. 7 illustrates a flowchart of an example of a UML sequence diagram 700 for the process flow of FIG. 6. As shown in FIG. 7, the UML sequence has portions corresponding to the VNF package uploads 700A, the PNFD uploads 700B, and NSD updates (700C).

Figure 9:
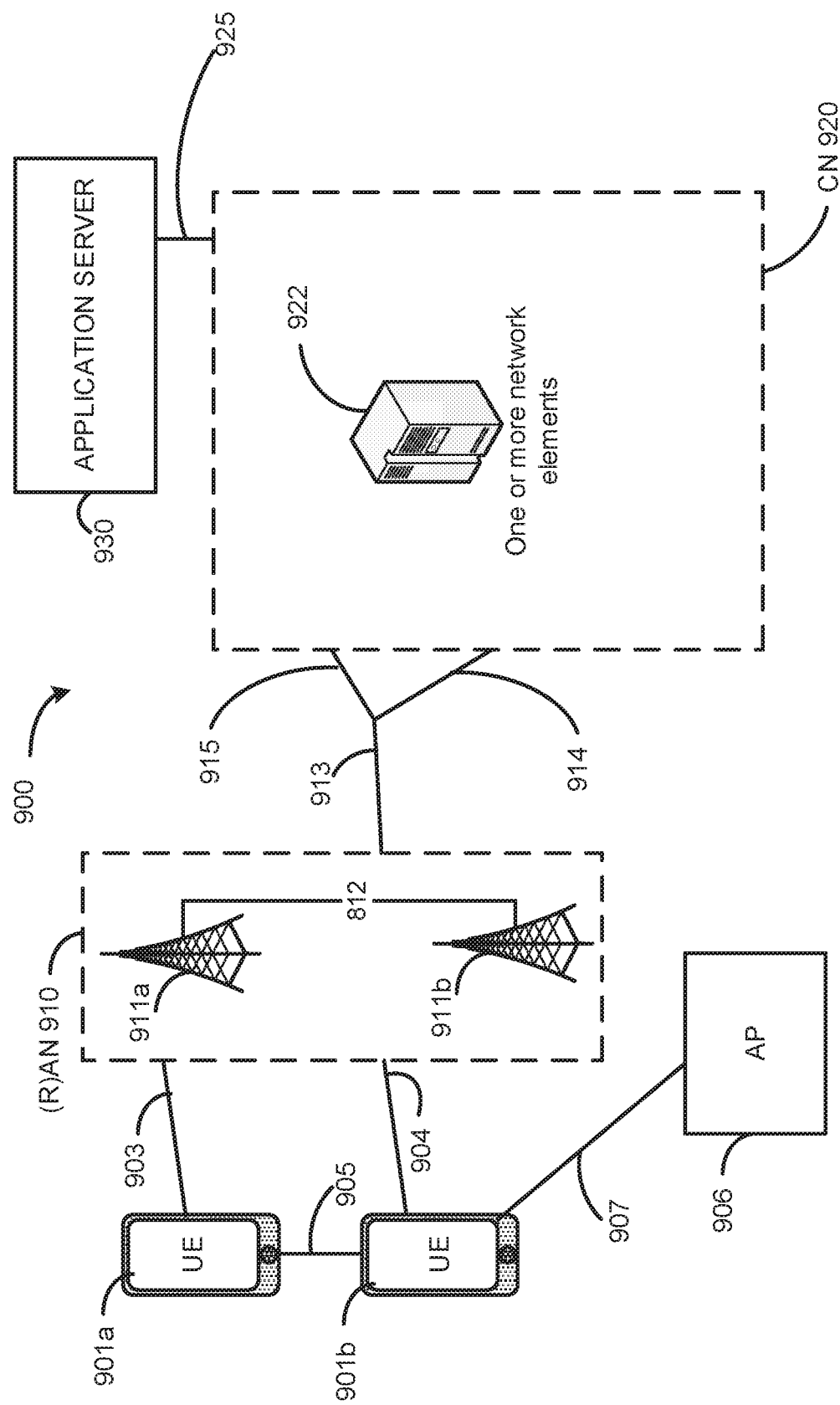
FIG. 9 illustrates an example of architecture of a system of a network.

FIG. 9 illustrates an example architecture of a system 900 of a network, in accordance with various implementations. The following description is provided for an example system 900 that operates in conjunction with the LTE system standards and 5G or NR system standards as provided by 3GPP technical specifications. However, the example implementations are not limited in this regard and the described implementations may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 9, the system 900 includes UE 901a and UE 901b (collectively referred to as "UEs 901" or "UE 901"). In this example, UEs 901 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some implementations, any of the UEs 901 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 may be configured to connect, for example, communicatively couple, with an or RAN 910. In implementations, the RAN 910 may be an NG RAN or a 5G RAN, an E-UTRAN, or a legacy RAN, such as a UTRAN or GERAN. As used herein, the term "NG RAN" or the like may refer to a RAN 910 that operates in an NR or 5G system 900, and the term "E-UTRAN" or the like may refer to a RAN 910 that operates in an LTE or 4G system 900. The UEs 901 utilize connections (or channels) 903 and 904, respectively, each of which comprises a physical communications interface or layer (discussed in further detail below).

In this example, the connections 903 and 904 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In implementations, the UEs 901 may directly exchange communication data via a ProSe interface 905. The ProSe interface 905 may alternatively be referred to as a SL interface 905 and may comprise one or more logical channels, including but not limited to a PSCCH, a PSSCH, a PSDCH, and a PSBCH.

The UE 901b is shown to be configured to access an AP 906 (also referred to as "WLAN node 906," "WLAN 906," "WLAN Termination 906," "WT 906" or the like) via connection 907. The connection 907 can comprise a local wireless connection, such as a connection consistent with any IEEE 802.11 protocol, wherein the AP 906 would comprise a wireless fidelity (Wi-Fi®) router. In this example, the AP 906 is shown to be connected to the Internet without connecting to the core network of the wireless system (described in further detail below). In various implementations, the UE 901b, RAN 910, and AP 906 may be configured to utilize LWA operation and/or LWIP operation.

The LWA operation may involve the UE 901*b* in RRC_CONNECTED being configured by a RAN node 911*a*-*b* to utilize radio resources of LTE and WLAN. LWIP operation may involve the UE 901*b* using WLAN radio resources (e.g., connection 907) via IPsec protocol tunneling to authenticate and encrypt packets (e.g., IP packets) sent over the connection 907. IPsec tunneling may include encapsulating the entirety of original IP packets and adding a new packet header, thereby protecting the original header of the IP packets.

The RAN 910 can include one or more AN nodes or RAN nodes 911*a* and 911*b* (collectively referred to as "RAN nodes 911" or "RAN node 911") that enable the connections 903 and 904. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 911 that operates in an NR or 5G system 900 (for example, a gNB), and the term "E-UTRAN node" or the like may refer to a RAN node 911 that operates in an LTE or 4G system 900 (e.g., an eNB). According to various implementations, the RAN nodes 911 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the RAN nodes 911 may be implemented as one or more software entities running on server computers as part of a virtual network, which may be referred to as a CRAN and/or a virtual baseband unit pool (vBBUP). In these implementations, the CRAN or vBBUP may implement a RAN function split, such as a PDCP split wherein RRC and PDCP layers are operated by the CRAN/vBBUP and other L2 protocol entities are operated by individual RAN nodes 911; a MAC/PHY split wherein RRC, PDCP, RLC, and MAC layers are operated by the CRAN/vBBUP and the PHY layer is operated by individual RAN nodes 911; or a "lower PHY" split wherein RRC, PDCP, RLC, MAC layers and upper portions of the PHY layer are operated by the CRAN/vBBUP and lower portions of the PHY layer are operated by individual RAN nodes 911. This virtualized framework allows the freed-up processor cores of the RAN nodes 911 to perform other virtualized applications. In some implementations, an individual RAN node 911 may represent individual gNB-DUs that are connected to a gNB-CU via individual F1 interfaces (not shown by FIG. 9). In these implementations, the gNB-DUs may include one or more remote radio heads or RFEMs, and the gNB-CU may be operated by a server that is located in the RAN 910 (not shown) or by a server pool in a similar manner as the CRAN/vBBUP. Additionally or alternatively, one or more of the RAN nodes 911 may be next generation eNBs (ng-eNBs), which are RAN nodes that provide E-UTRA user plane and control plane protocol terminations toward the UEs 901, and are connected to a 5GC via an NG interface (discussed infra).

In V2X scenarios one or more of the RAN nodes 911 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 901 (vUEs 901). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 911 can terminate the air interface protocol and can be the first point of contact for the UEs 901. In some implementations, any of the RAN nodes 911 can fulfill various logical functions for the RAN 910 including, but not limited to, radio network controller (RNC) functions such as radio bearer management, uplink and downlink dynamic radio resource management and data packet scheduling, and mobility management.

In implementations, the UEs 901 can be configured to communicate using OFDM communication signals with each other or with any of the RAN nodes 911 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the implementations is not limited in this respect. The OFDM signals can comprise a plurality of orthogonal subcarriers.

In some implementations, a downlink resource grid can be used for downlink transmissions from any of the RAN nodes 911 to the UEs 901, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various implementations, the UEs 901 and the RAN nodes 911 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 901 and the RAN nodes 911 may operate using LAA, eLAA, and/or feLAA mechanisms. In these implementations, the UEs 901 and the RAN nodes 911 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 901 RAN nodes 911, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 901, AP 906, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 901 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 901. The PDCCH carries information about the transport format and resource allocations related to the PDSCH channel, among other things. It may also inform the UEs 901 about the transport format, resource allocation, and HARQ information related to the uplink shared channel. Typically, downlink scheduling (assigning control and shared channel resource blocks to the UE 901*b* within a cell) may be performed at any of the RAN nodes 911 based on channel quality information fed back from any of the UEs 901. The downlink resource assignment information may be sent on the PDCCH used for (e.g., assigned to) each of the UEs 901.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some implementations may use concepts for resource allocation for control channel information that are an extension of the above-described concepts. For example, some implementations may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 911 may be configured to communicate with one another via interface 912. In implementations where the system 900 is an LTE system, the interface 912 may be an X2 interface 912. The X2 interface may be defined between two or more RAN nodes 911 (e.g., two or more eNBs and the like) that connect to EPC 920, and/or between two eNBs connecting to EPC 920. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 901 from an SeNB for user data; information of PDCP PDUs that were not delivered to a UE 901; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In implementations where the system 900 is a 5G or NR system, the interface 912 may be an Xn interface 912. The Xn interface is defined between two or more RAN nodes 911 (e.g., two or more gNBs and the like) that connect to 5GC 920, between a RAN node 911 (e.g., a gNB) connecting to 5GC 920 and an eNB, and/or between two eNBs connecting to 5GC 920. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 901 in a connected mode (e.g., CM-CONNECTED) including functionality to manage the UE mobility for connected mode between one or more RAN nodes 911. The mobility support may include context transfer from an old (source) serving RAN node 911 to new (target) serving RAN node 911; and control of user plane tunnels between old (source) serving RAN node 911 to new (target) serving RAN node 911. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 910 is shown to be communicatively coupled to a core network-in this implementation, core network (CN) 920. The CN 920 may comprise a plurality of network elements 922, which are configured to offer various data and telecommunications services to customers/subscribers (e.g., users of UEs 901) who are connected to the CN 920 via the RAN 910. The components of the CN 920 may be implemented in one physical node or separate physical nodes including components to read and execute instructions from a machine-readable or computer-readable medium (e.g., a non-transitory machine-readable storage medium). In some implementations, NFV may be utilized to virtualize any or all of the above-described network node functions via executable instructions stored in one or more computer-readable storage mediums (described in further detail below). A logical instantiation of the CN 920 may be referred to as a network slice, and a logical instantiation of a portion of the CN 920 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 930 may be an element offering applications that use IP bearer resources with the core network (e.g., UMTS PS domain, LTE PS data services, etc.). The application server 930 can also be configured to support one or more communication services (e.g., VoIP sessions, PTT sessions, group communication sessions, social networking services, etc.) for the UEs 901 via the EPC 920.

In implementations, the CN 920 may be a 5GC (referred to as "5GC 920" or the like), and the RAN 910 may be connected with the CN 920 via an NG interface 913. In implementations, the NG interface 913 may be split into two parts, an NG user plane (NG-U) interface 914, which carries traffic data between the RAN nodes 911 and a UPF, and the S1 control plane (NG-C) interface 915, which is a signaling interface between the RAN nodes 911 and AMFs.

In implementations, the CN 920 may be a 5G CN (referred to as "5GC 920" or the like), while in other implementations, the CN 920 may be an EPC). Where CN 920 is an EPC (referred to as "EPC 920" or the like), the RAN 910 may be connected with the CN 920 via an S1 interface 913. In implementations, the S1 interface 913 may be split into two parts, an S1 user plane (S1-U) interface 914, which carries traffic data between the RAN nodes 911 and the S-GW, and the S1-MME interface 915, which is a signaling interface between the RAN nodes 911 and MMEs.

Figure 10:
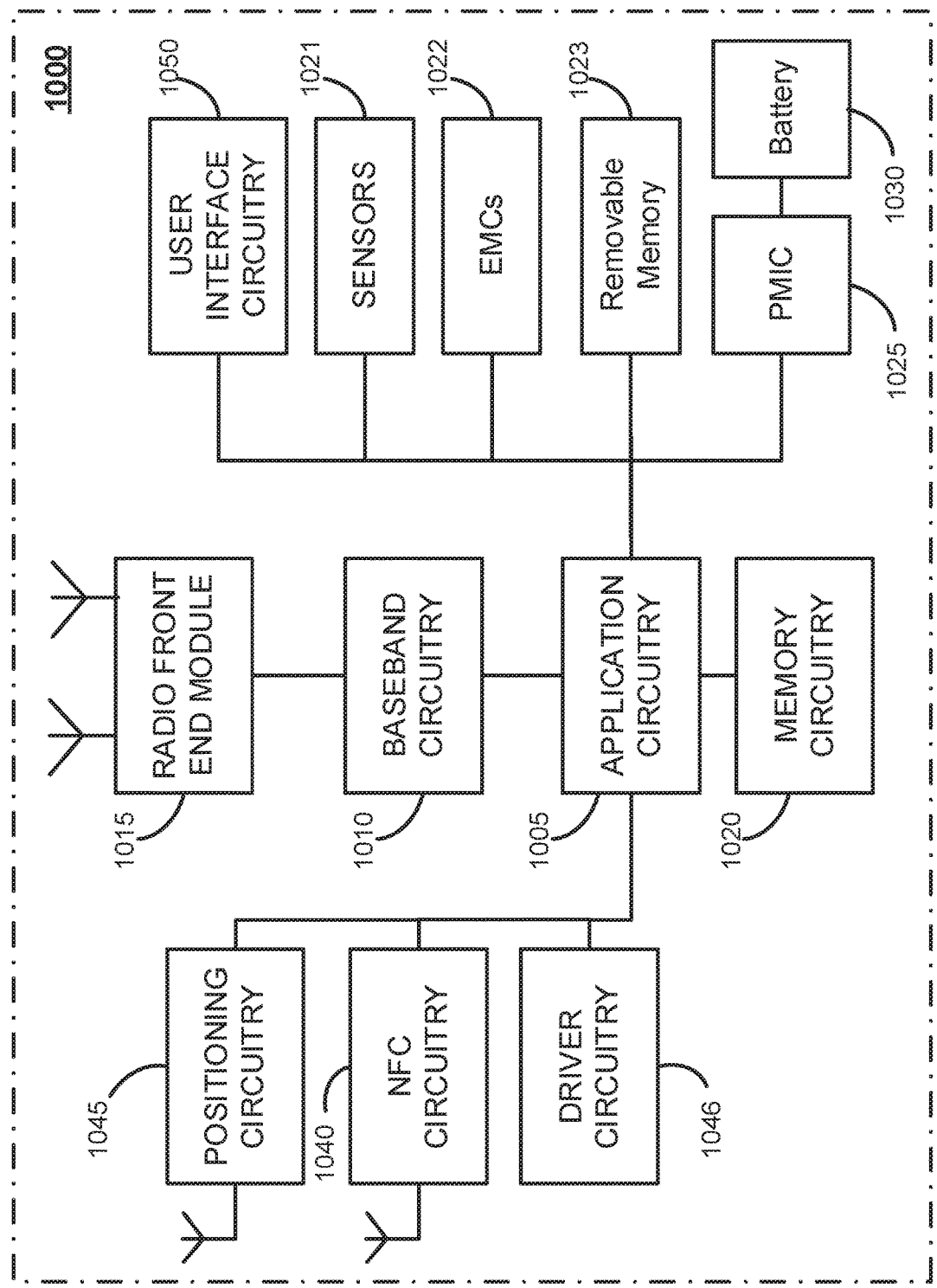
FIG. 10 illustrates an example of a platform.

FIG. 10 illustrates an example of a platform 1000 (or "device 1000") in accordance with various implementations. In implementations, the computer platform 1000 may be suitable for use as UEs 901, application servers 930, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1005 includes circuitry such as, but not limited to one or more processors (or processor cores), cache memory, and one or more of LDOs, interrupt controllers, serial interfaces such as SPI, I$^2$C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry may comprise, or may be, a special-purpose processor/controller to operate according to the various implementations herein.

As examples, the processor(s) of application circuitry 1005 may include an Apple A-series processor. The processors of the application circuitry 505 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1005 may be a part of a system on a chip (SoC) in which the application circuitry 1005 and other components are formed into a single integrated circuit, or a single package.

Additionally or alternatively, application circuitry 1005 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1005 may comprise logic blocks or logic fabric, and other interconnected resources that may be programmed to perform various functions, such as the procedures, methods, functions, etc. of the various implementations discussed herein. In such implementations, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1010 are discussed infra with regard to FIG. 11.

The RFEMs 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1111 of Figure XT infra), and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include any number and type of memory devices used to provide for a given amount of system memory. As examples, the memory circuitry 1020 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1020 may be developed in accordance with a Joint Electron Devices Engineering Council (JEDEC) low power double data rate (LPDDR)-based design, such as LPDDR2, LPDDR3, LPDDR4, or the like. Memory circuitry 1020 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1020 may be on-die memory or registers associated with the application circuitry 1005. To provide for persistent storage of information such as data, applications, operating systems and so forth, memory circuitry 1020 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1000 may incorporate the three-dimensional (3D) cross-point (XPOINT) memories from Intel® and Micron®.

Removable memory circuitry 1023 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensor circuitry 1021 and electro-mechanical components (EMCs) 1022, as well as removable memory devices coupled to removable memory circuitry 1023.

The sensor circuitry 1021 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors;

barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1022 include devices, modules, or subsystems whose purpose is to enable platform 1000 to change its state, position, and/or orientation, or move or control a mechanism or (sub)system. Additionally, EMCs 1022 may be configured to generate and send messages/signalling to other components of the platform 1000 to indicate a current state of the EMCs 1022. Examples of the EMCs 1022 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In implementations, platform 1000 is configured to operate one or more EMCs 1022 based on one or more captured events and/or instructions or control signals received from a service provider and/or various clients.

In some implementations, the interface circuitry may connect the platform 1000 with positioning circuitry 1045. The positioning circuitry 1045 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 1045 may include a Micro-PNT IC that uses a master timing clock to perform position tracking/estimation without GNSS assistance. The positioning circuitry 1045 may also be part of, or interact with, the baseband circuitry and/or RFEMs 1015 to communicate with the nodes and components of the positioning network. The positioning circuitry 1045 may also provide position data and/or time data to the application circuitry 1005, which may use the data to synchronize operations with various infrastructure (e.g., radio base stations), for turn-by-turn navigation applications, or the like.

In some implementations, the interface circuitry may connect the platform 1000 with Near-Field Communication (NFC) circuitry 1040. NFC circuitry 1040 is configured to provide contactless, short-range communications based on radio frequency identification (RFID) standards, wherein magnetic field induction is used to enable communication between NFC circuitry 1040 and NFC-enabled devices external to the platform 1000 (e.g., an "NFC touchpoint"). NFC circuitry 1040 comprises an NFC controller coupled with an antenna element and a processor coupled with the NFC controller. The NFC controller may be a chip/IC providing NFC functionalities to the NFC circuitry 1040 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1040, or initiate data transfer between the NFC circuitry 1040 and another active NFC device (e.g., a smartphone or an NFC-enabled POS terminal) that is proximate to the platform 1000.

The driver circuitry 1046 may include software and hardware elements that operate to control particular devices that are embedded in the platform 1000, attached to the platform 1000, or otherwise communicatively coupled with the platform 1000. The driver circuitry 1046 may include individual drivers allowing other components of the platform 1000 to interact with or control various input/output (I/O) devices that may be present within, or connected to, the platform 1000. For example, driver circuitry 1046 may include a display driver to control and allow access to a display device, a touchscreen driver to control and allow access to a touchscreen interface of the platform 1000, sensor drivers to obtain sensor readings of sensor circuitry 1021 and control and allow access to sensor circuitry 1021, EMC drivers to obtain actuator positions of the EMCs 1022 and/or control and allow access to the EMCs 1022, a camera driver to control and allow access to an embedded image capture device, audio drivers to control and allow access to one or more audio devices.

The power management integrated circuitry (PMIC) 1025 (also referred to as "power management circuitry 1025") may manage power provided to various components of the platform 1000. In particular, with respect to the baseband circuitry 1010, the PMIC 1025 may control power-source selection, voltage scaling, battery charging, or DC-to-DC conversion. The PM IC 1025 may often be included when the platform 1000 is capable of being powered by a battery 1030, for example, when the device is included in a UE 901.

In some implementations, the PMIC 1025 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1030 may power the platform 1000, although in some examples the platform 1000 may be mounted deployed in a fixed location, and may have a power supply coupled to an electrical grid. The battery 1030 may be a lithium ion battery, a metal-air battery, such as a zinc-air battery, an aluminum-air battery, a lithium-air battery, and the like. In some implementations, such as in V2X applications, the battery 1030 may be a typical lead-acid automotive battery.

In some implementations, the battery 1030 may be a "smart battery," which includes or is coupled with a Battery Management System (BMS) or battery monitoring integrated circuitry. The BMS may be included in the platform 1000 to track the state of charge (SoCh) of the battery 1030. The BMS may be used to monitor other parameters of the battery 1030 to provide failure predictions, such as the state of health (SoH) and the state of function (SoF) of the battery 1030. The BMS may communicate the information of the battery 1030 to the application circuitry 1005 or other components of the platform 1000. The BMS may also include an analog-to-digital (ADC) convertor that allows the application circuitry 1005 to directly monitor the voltage of the battery 1030 or the current flow from the battery 1030. The battery parameters may be used to determine actions that the platform 1000 may perform, such as transmission frequency, network operation, sensing frequency, and the like.

A power block, or other power supply coupled to an electrical grid may be coupled with the BMS to charge the battery 1030. In some examples, the power block may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1030, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1050 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1050 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some implementations, the sensor circuitry 1021 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 11:
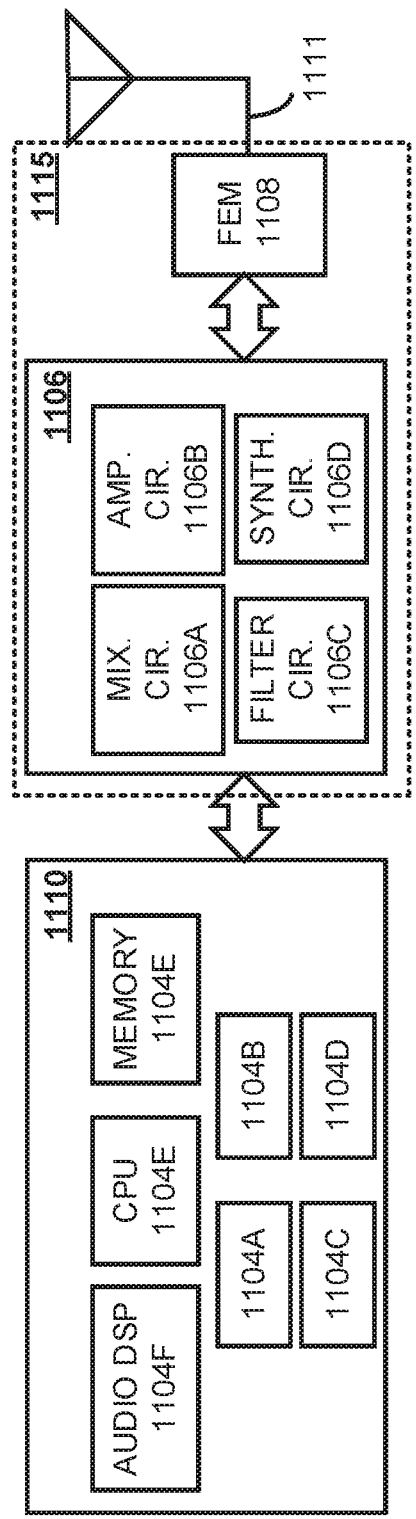
FIG. 11 illustrates example components of baseband circuitry and radio front end modules (RFEM).

FIG. 11 illustrates example components of baseband circuitry and radio front end modules (RFEM).

Figure XT illustrates example components of baseband circuitry 1110 and radio front end modules (RFEM) 1115 in accordance with various implementations. The baseband circuitry 1110 corresponds to the baseband circuitry 1010 of FIG. 10, respectively. The RFEM 1115 corresponds to the RFEM 1015 of FIG. 10, respectively. As shown, the RFEMs 1115 may include Radio Frequency (RF) circuitry 1106, front-end module (FEM) circuitry 1108, antenna array 1111 coupled together at least as shown.

The baseband circuitry 1110 includes circuitry and/or control logic configured to carry out various radio/network protocol and radio control functions that enable communication with one or more radio networks via the RF circuitry 1106. The radio control functions may include, but are not limited to, signal modulation/demodulation, encoding/decoding, radio frequency shifting, etc. In some implementations, modulation/demodulation circuitry of the baseband circuitry 1110 may include Fast-Fourier Transform (FFT), precoding, or constellation mapping/demapping functionality. In some implementations, encoding/decoding circuitry of the baseband circuitry 1110 may include convolution, tail-biting convolution, turbo, Viterbi, or Low Density Parity Check (LDPC) encoder/decoder functionality. Implementations of modulation/demodulation and encoder/decoder functionality are not limited to these examples and may include other suitable functionality in other implementations. The baseband circuitry 1110 is configured to process baseband signals received from a receive signal path of the RF circuitry 1106 and to generate baseband signals for a transmit signal path of the RF circuitry 1106. The baseband circuitry 1110 is configured to interface with application circuitry 1005 (see FIG. 10) for generation and processing of the baseband signals and for controlling operations of the RF circuitry 1106. The baseband circuitry 1110 may handle various radio control functions.

The aforementioned circuitry and/or control logic of the baseband circuitry 1110 may include one or more single or multi-core processors. For example, the one or more processors may include a 3G baseband processor 1104A, a 4G/LTE baseband processor 1104B, a 5G/NR baseband processor 1104C, or some other baseband processor(s) 1104D for other existing generations, generations in development or to be developed in the future (e.g., sixth generation (6G), etc.). In other implementations, some or all of the functionality of baseband processors 1104A-D may be included in modules stored in the memory 1104G and executed via a Central Processing Unit (CPU) 1104E. In other implementations, some or all of the functionality of baseband processors 1104A-D may be provided as hardware accelerators (e.g., FPGAs, ASICs, etc.) loaded with the appropriate bit streams or logic blocks stored in respective memory cells. In various implementations, the memory 1104G may store program code of a real-time OS (RTOS), which when executed by the CPU 1104E (or other baseband processor), is to cause the CPU 1104E (or other baseband processor) to manage resources of the baseband circuitry 1110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1110 includes one or more audio digital signal processor(s) (DSP) 1104F. The audio DSP(s) 1104F include elements for compression/decompression and echo cancellation and may include other suitable processing elements in other implementations.

In some implementations, each of the processors 1104A-1104E include respective memory interfaces to send/receive data to/from the memory 1104G. The baseband circuitry 1110 may further include one or more interfaces to communicatively couple to other circuitries/devices, such as an interface to send/receive data to/from memory external to the baseband circuitry 1110; an application circuitry interface to send/receive data to/from the application circuitry 1005 of FIG. XT); an RF circuitry interface to send/receive data to/from RF circuitry 1106 of Figure XT; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1025.

In alternate implementations (which may be combined with the above described implementations), baseband circuitry 1110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1110 may include protocol processing circuitry with one or more instances of control circuitry (not shown) to provide control functions for the digital baseband circuitry and/or radio frequency circuitry (e.g., the radio front end modules 1115).

Although not shown by Figure XT, in some implementations, the baseband circuitry 1110 includes individual processing device(s) to operate one or more wireless communication protocols (e.g., a "multi-protocol baseband processor" or "protocol processing circuitry") and individual processing device(s) to implement PHY layer functions. In these implementations, the PHY layer functions include the aforementioned radio control functions. In these implementations, the protocol processing circuitry operates or implements various protocol layers/entities of one or more wireless communication protocols. In a first example, the protocol processing circuitry may operate LTE protocol entities and/or 5G/NR protocol entities when the baseband circuitry 1110 and/or RF circuitry 1106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1110 and/or RF circuitry 1106 are part of a Wi-Fi communication system. In the second example, the protocol processing circuitry would operate Wi-Fi MAC and logical link control (LLC) functions. The protocol processing circuitry may include one or more memory structures (e.g., 1104G) to store program code and data for operating the protocol functions, as well as one or more processing cores to execute the program code and perform various operations using the data. The baseband circuitry 1110 may also support radio communications for more than one wireless protocol.

The various hardware elements of the baseband circuitry 1110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1110 may be suitably combined in a single chip or chipset, or disposed on a same circuit board. In another example, some or all of the constituent components of the baseband circuitry 1110 and RF circuitry 1106 may be implemented together such as, for example, a system on a chip (SoC) or System-in-Package (SiP). In another example, some or all of the constituent components of the baseband circuitry 1110 may be implemented as a separate SoC that is communicatively coupled with and RF circuitry 1106 (or multiple instances of RF circuitry 1106). In yet another example, some or all of the constituent components of the baseband circuitry 1110 and the application circuitry 1005 may be implemented together as individual SoCs mounted to a same circuit board (e.g., a "multi-chip package").

In some implementations, the baseband circuitry 1110 may provide for communication compatible with one or more radio technologies. For example, in some implementations, the baseband circuitry 1110 may support communication with an E-UTRAN or other WMAN, a WLAN, a WPAN. Implementations in which the baseband circuitry 1110 is configured to support radio communications of more than one wireless protocol may be referred to as multi-mode baseband circuitry.

RF circuitry 1106 may enable communication with wireless networks using modulated electromagnetic radiation through a non-solid medium. In various implementations, the RF circuitry 1106 may include switches, filters, amplifiers, etc. to facilitate the communication with the wireless network. RF circuitry 1106 may include a receive signal path, which may include circuitry to down-convert RF signals received from the FEM circuitry 1108 and provide baseband signals to the baseband circuitry 1110. RF circuitry 1106 may also include a transmit signal path, which may include circuitry to up-convert baseband signals provided by the baseband circuitry 1110 and provide RF output signals to the FEM circuitry 1108 for transmission.

In some implementations, the receive signal path of the RF circuitry 1106 may include mixer circuitry 1106a, amplifier circuitry 1106b and filter circuitry 1106c. In some implementations, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some implementations, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1110 for further processing. In some implementations, the output baseband signals may be zero-frequency baseband signals, although this is not a requirement. In some implementations, mixer circuitry 1106a of the receive signal path may comprise passive mixers, although the scope of the implementations is not limited in this respect.

In some implementations, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1110 and may be filtered by filter circuitry 1106c.

In some implementations, the mixer circuitry 1106a of the receive signal path and the mixer circuitry 1106a of the transmit signal path may include two or more mixers and may be arranged for quadrature downconversion and upconversion, respectively. In some implementations, the mixer circuitry 1106a of the receive signal path and the mixer circuitry 1106a of the transmit signal path may include two or more mixers and may be arranged for image rejection (e.g., Hartley image rejection). In some implementations, the mixer circuitry 1106a of the receive signal path and the mixer circuitry 1106a of the transmit signal path may be arranged for direct downconversion and direct upconversion, respectively. In some implementations, the mixer circuitry 1106a of the receive signal path and the mixer circuitry 1106a of the transmit signal path may be configured for super-heterodyne operation.

In some implementations, the output baseband signals and the input baseband signals may be analog baseband signals, although the scope of the implementations is not limited in this respect. In some alternate implementations, the output baseband signals and the input baseband signals may be digital baseband signals. In these alternate implementations, the RF circuitry 1106 may include analog-to-digital converter (ADC) and digital-to-analog converter (DAC) circuitry and the baseband circuitry 1110 may include a digital baseband interface to communicate with the RF circuitry 1106.

In some dual-mode implementations, a separate radio IC circuitry may be provided for processing signals for each spectrum, although the scope of the implementations is not limited in this respect.

In some implementations, the synthesizer circuitry 1106d may be a fractional-N synthesizer or a fractional N/N+1 synthesizer, although the scope of the implementations is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some implementations, the synthesizer circuitry 1106d may be a fractional N/N+1 synthesizer.

In some implementations, frequency input may be provided by a voltage controlled oscillator (VCO), although that is not a requirement. Divider control input may be provided by either the baseband circuitry 1110 or the application circuitry 1005 depending on the desired output frequency. In some implementations, a divider control input (e.g., N) may be determined from a look-up table based on a channel indicated by the application circuitry 1005.

Synthesizer circuitry 1106d of the RF circuitry 1106 may include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some example implementations, the DLL may include a set of cascaded, tunable, delay elements, a phase detector, a charge pump and a D-type flip-flop. In these implementations, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1106d may be configured to generate a carrier frequency as the output frequency, while in other implementations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency (fLO). In some implementations, the RF circuitry 1106 may include an IQ/polar converter.

FEM circuitry 1108 may include a receive signal path, which may include circuitry configured to operate on RF signals received from antenna array 1111, amplify the received signals and provide the amplified versions of the received signals to the RF circuitry 1106 for further processing. FEM circuitry 1108 may also include a transmit signal path, which may include circuitry configured to amplify signals for transmission provided by the RF circuitry 1106 for transmission by one or more of antenna elements of antenna array 1111. In various implementations, the amplification through the transmit or receive signal paths may be done solely in the RF circuitry 1106, solely in the FEM circuitry 1108, or in both the RF circuitry 1106 and the FEM circuitry 1108.

In some implementations, the FEM circuitry 1108 may include a TX/RX switch to switch between transmit mode and receive mode operation. The FEM circuitry 1108 may include a receive signal path and a transmit signal path. The receive signal path of the FEM circuitry 1108 may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission by one or more antenna elements of the antenna array 1111.

The antenna array 1111 comprises one or more antenna elements, each of which is configured convert electrical signals into radio waves to travel through the air and to convert received radio waves into electrical signals. For example, digital baseband signals provided by the baseband circuitry 1110 is converted into analog RF signals (e.g., modulated waveform) that will be amplified and transmitted via the antenna elements of the antenna array 1111 including one or more antenna elements (not shown). The antenna elements may be omnidirectional, direction, or a combination thereof. The antenna elements may be formed in a multitude of arranges as are known and/or discussed herein. The antenna array 1111 may comprise microstrip antennas or printed antennas that are fabricated on the surface of one or more printed circuit boards. The antenna array 1111 may be formed in as a patch of metal foil (e.g., a patch antenna) in a variety of shapes, and may be coupled with the RF circuitry 1106 and/or FEM circuitry 1108 using metal transmission lines or the like.

Processors of the application circuitry 1005 and processors of the baseband circuitry 1110 may be used to execute elements of one or more instances of a protocol stack. For example, processors of the baseband circuitry 1110, alone or in combination, may be used execute Layer 3, Layer 2, or Layer 1 functionality, while processors of the application circuitry 1005 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PH Y layer of a UE/RAN node, described in further detail below.

Figure 12:
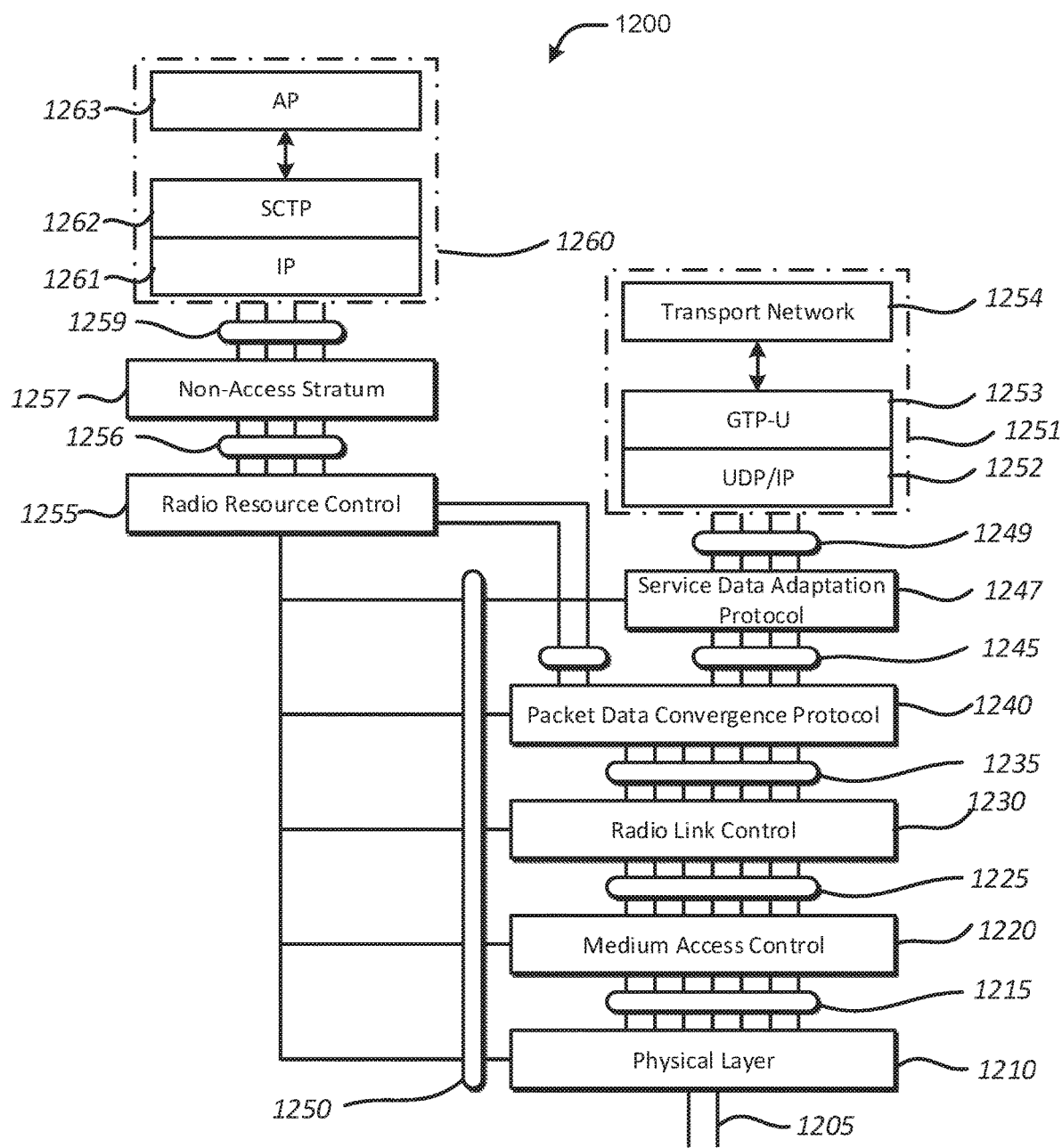
FIG. 12 illustrates various protocol functions that may be implemented in a wireless communication device.

FIG. 12 illustrates various protocol functions that may be implemented in a wireless communication device according to various implementations. In particular, FIG. 12 includes an arrangement 1200 showing interconnections between various protocol layers/entities. The following description of FIG. 12 is provided for various protocol layers/entities that operate in conjunction with the 5G/NR system standards and LTE system standards, but some or all of the aspects of FIG. 12 may be applicable to other wireless communication network systems as well.

The protocol layers of arrangement 1200 may include one or more of PHY 1210, MAC 1220, RLC 1230, PDCP 1240, SDAP 1247, RRC 1255, and NAS layer 1257, in addition to other higher layer functions not illustrated. The protocol layers may include one or more service access points (e.g., items 1259, 1256, 1250, 1249, 1245, 1235, 1225, and 1215 in FIG. 12) that may provide communication between two or more protocol layers.

The PHY 1210 may transmit and receive physical layer signals 1205 that may be received from or transmitted to one or more other communication devices. The physical layer signals 1205 may comprise one or more physical channels, such as those discussed herein. The PHY 1210 may further perform link adaptation or adaptive modulation and coding (AMC), power control, cell search (e.g., for initial synchronization and handover purposes), and other measurements used by higher layers, such as the RRC 1255. The PHY 1210 may still further perform error detection on the transport channels, forward error correction (FEC) coding/decoding of the transport channels, modulation/demodulation of physical channels, interleaving, rate matching, mapping onto physical channels, and MIMO antenna processing. In implementations, an instance of PHY 1210 may process requests from and provide indications to an instance of MAC 1220 via one or more PHY-SAP 1215. According to some implementations, requests and indications communicated via PHY-SAP 1215 may comprise one or more transport channels.

Instance(s) of MAC 1220 may process requests from, and provide indications to, an instance of RLC 1230 via one or more MAC-SAPs 1225. These requests and indications communicated via the MAC-SAP 1225 may comprise one or more logical channels. The MAC 1220 may perform mapping between the logical channels and transport channels, multiplexing of MAC SDUs from one or more logical channels onto TBs to be delivered to PHY 1210 via the transport channels, de-multiplexing MAC SDUs to one or more logical channels from TBs delivered from the PHY 1210 via transport channels, multiplexing MAC SDUs onto TBs, scheduling information reporting, error correction through HARQ, and logical channel prioritization.

Instance(s) of RLC 1230 may process requests from and provide indications to an instance of PDCP 1240 via one or more radio link control service access points (RLC-SAP) 1235. These requests and indications communicated via RLC-SAP 1235 may comprise one or more RLC channels. The RLC 1230 may operate in a plurality of modes of operation, including: Transparent Mode (TM), Unacknowledged Mode (UM), and Acknowledged Mode (AM). The RLC 1230 may execute transfer of upper layer protocol data units (PDUs), error correction through automatic repeat request (ARQ) for AM data transfers, and concatenation, segmentation and reassembly of RLC SDUs for UM and AM data transfers. The RLC 1230 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1240 may process requests from and provide indications to instance(s) of RRC 1255 and/or instance(s) of SDAP 1247 via one or more packet data convergence protocol service access points (PDCP-SAP) 1245. These requests and indications communicated via PDCP-SAP 1245 may comprise one or more radio bearers. The PDCP 1240 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1247 may process requests from and provide indications to one or more higher layer protocol entities via one or more SDAP-SAP 1249. These requests and indications communicated via SDAP-SAP 1249 may comprise one or more QoS flows. The SDAP 1247 may map QoS flows to DRBs, and vice versa, and may also mark QFIs in DL and UL packets. A single SDAP entity 1247 may be configured for an individual PDU session. In the UL direction, the NG-RAN 910 may control the mapping of QoS Flows to DRB(s) in two different ways, reflective mapping or explicit mapping. For reflective mapping, the SDAP 1247 of a UE 901 may monitor the QFIs of the DL packets for each DRB, and may apply the same mapping for packets flowing in the UL direction. For a DRB, the SDAP 1247 of the UE 901 may map the UL packets belonging to the QoS flows(s) corresponding to the QoS flow ID(s) and PDU session observed in the DL packets for that DRB. To enable reflective mapping, the NG-RAN may mark DL packets over the Uu interface with a QoS flow ID. The explicit mapping may involve the RRC 1255 configuring the SDAP 1247 with an explicit QoS flow to DRB mapping rule, which may be stored and followed by the SDAP 1247. In implementations, the SDAP 1247 may only be used in NR implementations and may not be used in LTE implementations.

The RRC 1255 may configure, via one or more management service access points (M-SAP), aspects of one or more protocol layers, which may include one or more instances of PHY 1210, MAC 1220, RLC 1230, PDCP 1240 and SDAP 1247. In implementations, an instance of RRC 1255 may process requests from and provide indications to one or more NAS entities 1257 via one or more RRC-SAPs 1256. The main services and functions of the RRC 1255 may include broadcast of system information (e.g., included in MIBs or SIBs related to the NAS), broadcast of system information related to the access stratum (AS), paging, establishment, maintenance and release of an RRC connection between the UE 901 and RAN 910 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1257 may form the highest stratum of the control plane between the UE 901 and the AMF. The NAS 1257 may support the mobility of the UEs 901 and the session management procedures to establish and maintain IP connectivity between the UE 901 and a P-GW in LTE systems.

According to various implementations, one or more protocol entities of arrangement 1200 may be implemented in UEs 901, RAN nodes 911, AMF in NR implementations or MME in LTE implementations, UPF in NR implementations or S-GW and P-GW in LTE implementations, or the like to be used for control plane or user plane communications protocol stack between the aforementioned devices. In such implementations, one or more protocol entities that may be implemented in one or more of UE 901, gNB 911, etc. may communicate with a respective peer protocol entity that may be implemented in or on another device using the services of respective lower layer protocol entities to perform such communication. In some implementations, a gNB-CU of the gNB 911 may host the RRC 1255, SDAP 1247, and PDCP 1240 of the gNB that controls the operation of one or more gNB-DUs, and the gNB-DUs of the gNB 911 may each host the RLC 1230, MAC 1220, and PHY 1210 of the gNB 911.

In a first example, a control plane protocol stack may comprise, in order from highest layer to lowest layer, NAS 1257, RRC 1255, PDCP 1240, RLC 1230, MAC 1220, and PHY 1210. In this example, upper layers 1260 may be built on top of the NAS 1257, which includes an IP layer 1261, an SCTP 1262, and an application layer signaling protocol (AP) 1263.

In NR implementations, the AP 1263 may be an NG application protocol layer (NGAP or NG-AP) 1263 for the NG interface 913 defined between the NG-RAN node 911 or the AP 1263 may be an Xn application protocol layer (XnAP or Xn-AP) 1263 for the Xn interface 912 that is defined between two or more RAN nodes 911.

The NG-AP 1263 may support the functions of the NG interface 913 and may comprise Elementary Procedures (EPs). An NG-AP EP may be a unit of interaction between the NG-RAN node 911 and the AMF. The NG-AP 1263 services may comprise two groups: UE-associated services (e.g., services related to a UE 901) and non-UE-associated services (e.g., services related to the whole NG interface instance between the NG-RAN node 911 and AMF). These services may include functions including, but not limited to: a paging function for the sending of paging requests to NG-RAN nodes 911 involved in a particular paging area; a UE context management function for allowing the AMF to establish, modify, and/or release a UE context in the AMF and the NG-RAN node 911; a mobility function for UEs 901 in ECM-CONNECTED mode for intra-system HOs to support mobility within NG-RAN and inter-system HOs to support mobility from/to EPS systems; a NAS Signaling Transport function for transporting or rerouting NAS messages between UE 901 and AMF; a NAS node selection function for determining an association between the AMF and the UE 901; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 911 via CN 920; and/or other like functions.

The XnAP 1263 may support the functions of the Xn interface 912 and may comprise XnAP basic mobility procedures and XnAP global procedures. The XnAP basic mobility procedures may comprise procedures used to handle UE mobility within the NG RAN 911 (or E-UTRAN), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 901, such as Xn interface setup and reset procedures, NG-RAN update procedures, cell activation procedures, and the like.

In LTE implementations, the AP 1263 may be an S1 Application Protocol layer (S1-AP) 1263 for the S1 interface 913 defined between an E-UTRAN node 911 and an MME, or the AP 1263 may be an X2 application protocol layer (X2AP or X2-AP) 1263 for the X2 interface 912 that is defined between two or more E-UTRAN nodes 911.

The S1 Application Protocol layer (S1-AP) 1263 may support the functions of the S1 interface, and similar to the NG-AP discussed previously, the S1-AP may comprise S1-AP EPs. An S1-AP EP may be a unit of interaction between the E-UTRAN node 911 and an MME within an LTE CN 920. The S1-AP 1263 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1263 may support the functions of the X2 interface 912 and may comprise X2AP basic mobility procedures and X2AP global procedures. The X2AP basic mobility procedures may comprise procedures used to handle UE mobility within the E-UTRAN 920, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 901, such as X2 interface setup and reset procedures, load indication procedures, error indication procedures, cell activation procedures, and the like.

The SCTP layer (alternatively referred to as the SCTP/IP layer) 1262 may provide guaranteed delivery of application layer messages (e.g., NGAP or XnAP messages in NR implementations, or S1-AP or X2AP messages in LTE implementations). The SCTP 1262 may ensure reliable delivery of signaling messages between the RAN node 911 and the AMF/MME based, in part, on the IP protocol, supported by the IP 1261. The Internet Protocol layer (IP) 1261 may be used to perform packet addressing and routing functionality. In some implementations the IP layer 1261 may use point-to-point transmission to deliver and convey PDUs. In this regard, the RAN node 911 may comprise L2 and L1 layer communication links (e.g., wired or wireless) with the MME/AMF to exchange information.

In a second example, a user plane protocol stack may comprise, in order from highest layer to lowest layer, SDAP 1247, PDCP 1240, RLC 1230, MAC 1220, and PHY 1210. The user plane protocol stack may be used for communication between the UE 901, the RAN node 911, and UPF in NR implementations or an S-GW and P-GW in LTE implementations. In this example, upper layers 1251 may be built on top of the SDAP 1247, and may include a user datagram protocol (UDP) and IP security layer (UDP/IP) 1252, a General Packet Radio Service (GPRS) Tunneling Protocol for the user plane layer (GTP-U) 1253, and a User Plane PDU layer (UP PDU) 1263.

The transport network layer 1254 (also referred to as a "transport layer") may be built on IP transport, and the GTP-U 1253 may be used on top of the UDP/IP layer 1252 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1253 may be used for carrying user data within the GPRS core network and between the radio access network and the core network. The user data transported can be packets in any of IPv4, IPv6, or PPP formats, for example. The UDP/IP 1252 may provide checksums for data integrity, port numbers for addressing different functions at the source and destination, and encryption and authentication on the selected data flows. The RAN node 911 and the S-GW may utilize an S1-U interface to exchange user plane data via a protocol stack comprising an L1 layer (e.g., PHY 1210), an L2 layer (e.g., MAC 1220, RLC 1230, PDCP 1240, and/or SDAP 1247), the UDP/IP layer 1252, and the GTP-U 1253. The S-GW and the P-GW may utilize an S5/S8a interface to exchange user plane data via a protocol stack comprising an L1 layer, an L2 layer, the UDP/IP layer 1252, and the GTP-U 1253. As discussed previously, NAS protocols may support the mobility of the UE 901 and the session management procedures to establish and maintain IP connectivity between the UE 901 and the P-GW.

Moreover, although not shown by FIG. 12, an application layer may be present above the AP 1263 and/or the transport network layer 1254. The application layer may be a layer in which a user of the UE 901, RAN node 911, or other network element interacts with software applications being executed, for example, by application circuitry 1005, respectively. The application layer may also provide one or more interfaces for software applications to interact with communications systems of the UE 901 or RAN node 911, such as the baseband circuitry 1110. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 13:
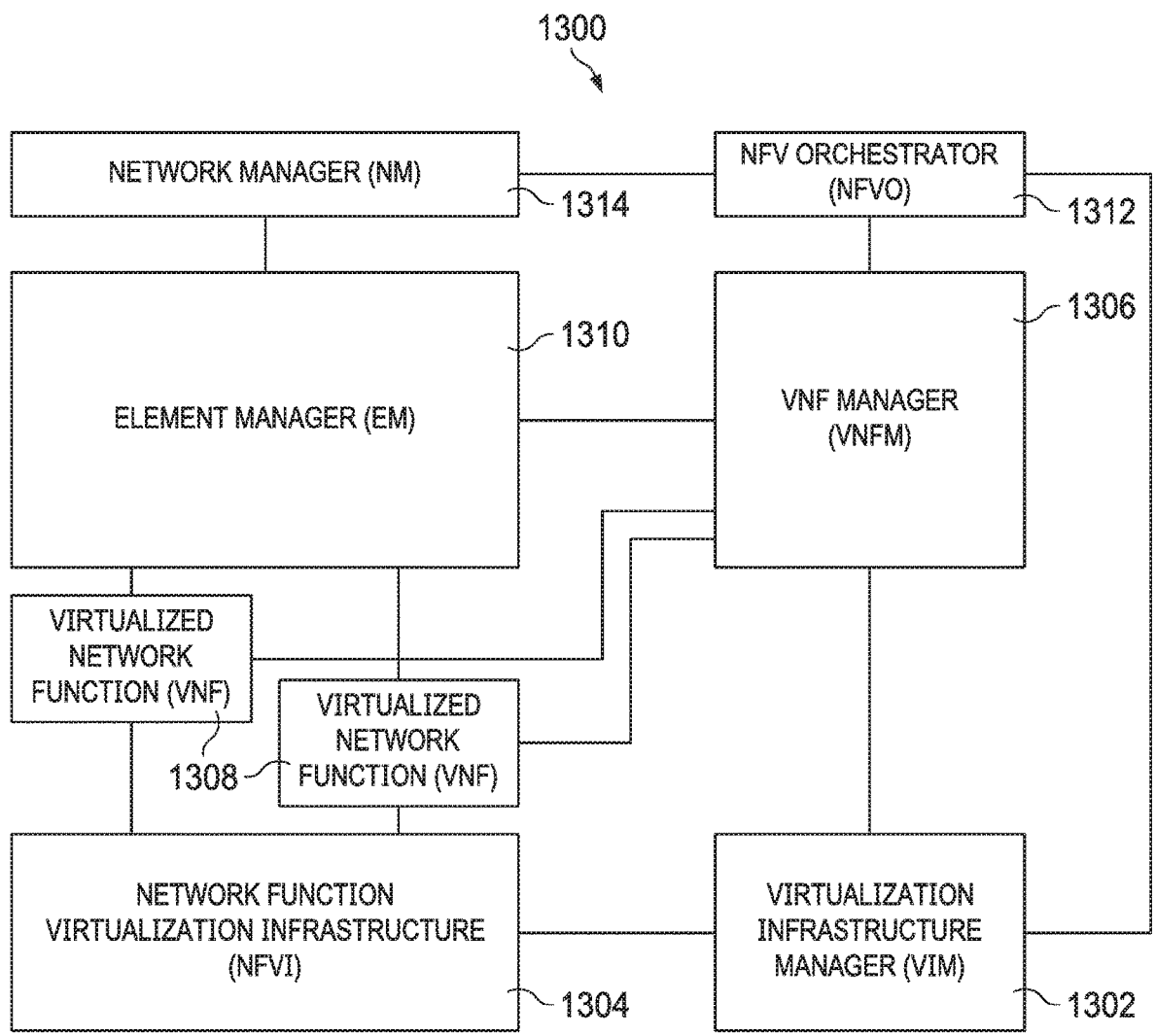
FIG. 13 is a block diagram illustrating components of a system to support NFV.

FIG. 13 is a block diagram illustrating components, according to some example implementations, of a system 1300 to support NFV. The system 1300 is illustrated as including a VIM 1302, an NFVI 1304, an VNFM 1306, VNFs 1308, an EM 1310, an NFVO 1312, and a NM 1314.

The VIM 1302 manages the resources of the NFVI 1304. The NFVI 1304 can include physical or virtual resources and applications (including hypervisors) used to execute the system 1300. The VIM 1302 may manage the life cycle of virtual resources with the NFVI 1304 (e.g., creation, maintenance, and tear down of VMs associated with one or more physical resources), track VM instances, track performance, fault and security of VM instances and associated physical resources, and expose VM instances and associated physical resources to other management systems.

The VNFM 1306 may manage the VNFs 1308. The VNFs 1308 may be used to execute EPC components/functions. The VNFM 1306 may manage the life cycle of the VNFs 1308 and track performance, fault and security of the virtual aspects of VNFs 1308. The EM 1310 may track the performance, fault and security of the functional aspects of VNFs 1308. The tracking data from the VNFM 1306 and the EM 1310 may comprise, for example, PM data used by the VIM 1302 or the NFVI 1304. Both the VNFM 1306 and the EM 1310 can scale up/down the quantity of VNFs of the system 1300.

The NFVO 1312 may coordinate, authorize, release and engage resources of the NFVI 1304 in order to provide the requested service (e.g., to execute an EPC function, component, or slice). The NM 1314 may provide a package of end-user functions with the responsibility for the management of a network, which may include network elements with VNFs, non-virtualized network functions, or both (management of the VNFs may occur via the EM 1310).

Figure 14:
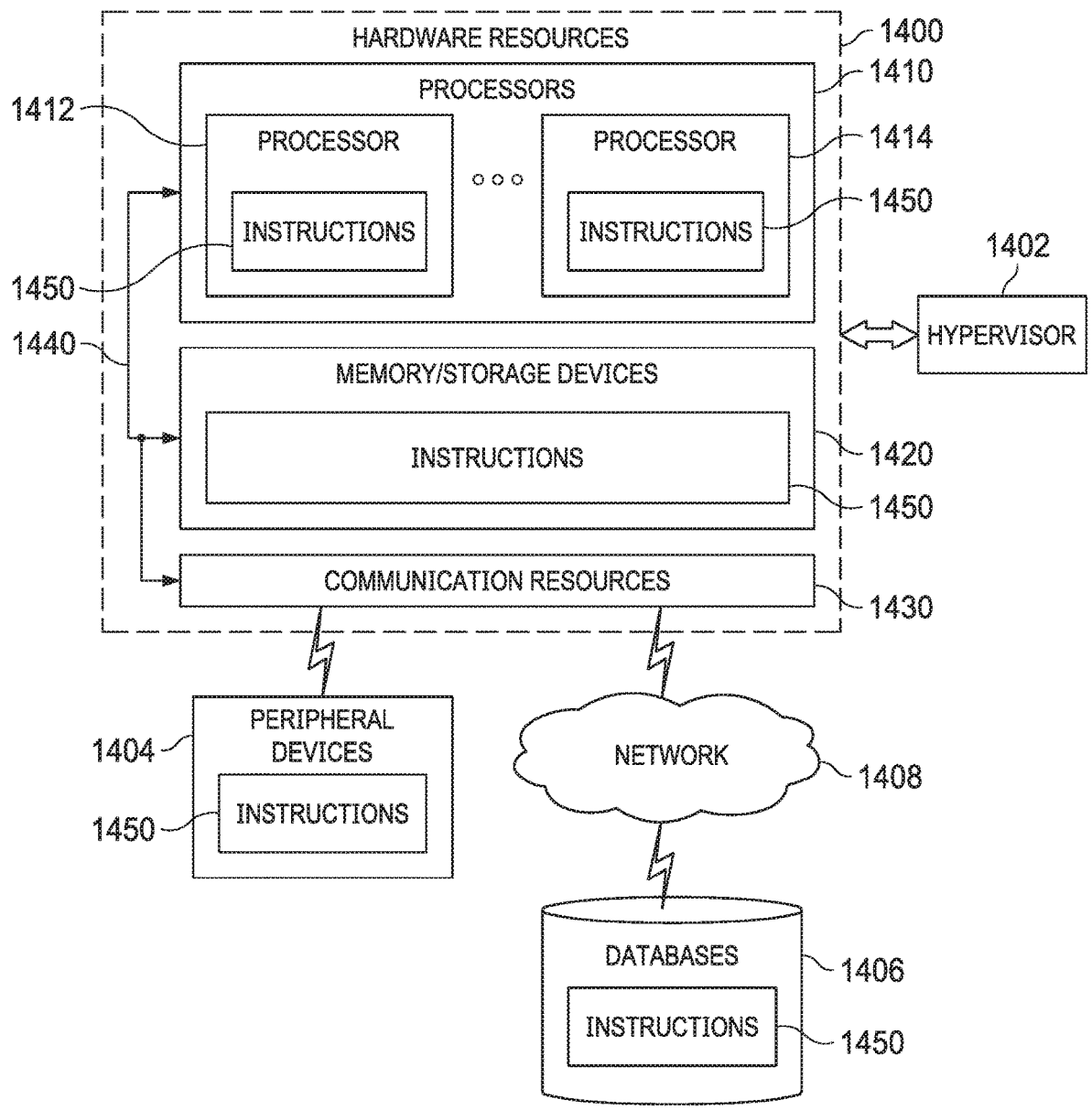
FIG. 14 is a block diagram illustrating components able to read instructions from a machine-readable or computer-readable medium (e.g., a non-transitory machine-readable storage medium) and perform any one or more of the methodologies discussed herein.

FIG. 14 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For implementations where node virtualization (e.g., NFV) is utilized, a hypervisor 1402 may be executed to provide an execution environment for one or more network slices/sub-slices to utilize the hardware resources 1400.

The processors 1410 may include, for example, a processor 1412 and a processor 1414. The processor(s) 1410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1420 may include main memory, disk storage, or any suitable combination thereof. The memory/storage devices 1420 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via USB), cellular communication components, NFC components, Bluetooth® (or Bluetooth® Low Energy) components, Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

OTHER IMPLEMENTATIONS

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

The invention claimed is:

1. A method comprising:
generating, for each virtual network function (VNF) of a plurality of VNFs comprising at least one distributed unit (DU) and at least one central unit (CU), a first request message that includes data representing a request to upload a VNF package for the VNF;
transmitting, to a network functions virtualization orchestrator (NFVO), the generated first request message;
receiving, from the NFVO, a first response message that includes data indicating that the VNF package upload was successful;
generating, for each physical network function (PNF) of a plurality of PNFs comprising at least one radio unit (RU), a second request message that includes data representing a request to upload a PNF Descriptor (PNFD) for the PNF;
transmitting the generated second request message to the NFVO; and
receiving, from the NFVO, a second response message that includes data indicating that the PNFD upload was successful.

2. The method of claim 1, wherein the NFVO is a component of an infrastructure management framework (IMFW).

3. The method of claim 1, wherein the generated first request message that includes the request to upload the VNF package includes an identifier of a VNF.

4. The method of claim 1, wherein one or more of (i) generating the first request message that includes the request to upload the VNF, or (ii) transmitting the generated first request message to the NFVO are performed using a service management and orchestration framework (SMOFW).

5. The method of claim 1, the method further comprising:
generating a third request message that includes data representing a request to update a network service descriptor (NSD) associated with the VNF packages and the PNFD that were previously uploaded;
transmitting, to the NFVO, the generated third request message; and
receiving, from the NFVO, a third response message that includes data indicating the NSD update was successful.

6. The method of claim 5, the method further comprising:
generating a fourth request message that includes data representing a request to update a network service (NS) instance associated with the updated NSD;
transmitting, to the NFVO, the generated fourth request message;
receiving, from the NFVO, a fourth response message that includes data indicating that the NS instance update has been started; and
receiving, from the NFVO, a fifth response message that includes data indicating a result of the NS instance update.

7. The method of claim 6, wherein the result of the NS instance update includes (i) data indicating that the NS instance update was successful or (ii) data indicating that the NS instance update was not successful.

8. The method of claim 1, wherein the VNF package includes a VNF descriptor for each VNF of the VNF package.

9. A system comprising one or more processors configured to perform operations comprising:
generating, for each virtual network function (VNF) of a plurality of VNFs comprising at least one distributed unit (DU) and at least one central unit (CU), a message that includes data representing a request to upload a VNF package for the VNF, wherein generated message that includes the request to upload the VNF package includes an identifier of a physical network function (PNF) of a plurality of PNFs comprising at least one radio unit (RU);
encoding the generated message that includes the VNF package for transmission to a network functions virtualization orchestrator (NFVO); and
transmitting the encoded message to the NFVO.

10. The system of claim 9, wherein the NFVO is a component of an infrastructure management framework (IMFW).

11. The system of claim 9, the operations further comprising:
receiving a message from the NFVO after transmission of the encoded message, wherein the received message includes data indicating that the VNF package has been uploaded successfully to the NFVO.

12. The system of claim 9, wherein the generated message that includes the request to upload the VNF package includes an identifier of a VNF.

13. The system of claim 9, wherein one or more of (i) generating the message that includes the request to upload the VNF, (ii) encoding the generated message that includes the VNF package for transmission to the network functions virtualization orchestrator (NFVO), or (iii) transmitting the encoded message to the NFVO are performed using a service management and orchestration framework (SMOFW).

14. One or more non-transitory computer-readable media storing software comprising instructions executable by one or more computers which, upon such execution, cause the one or more computers to perform operations comprising:
generating, for each virtual network function (VNF) of a plurality of VNFs comprising at least one distributed unit (DU) and at least one central unit (CU), a first request message that includes data representing a request to upload a VNF package for the VNF;
transmitting, to a network functions virtualization orchestrator (NFVO), the generated first request message;
receiving, from the NFVO, a first response message that includes data indicating that the VNF package upload was successful;
generating, for each physical network function (PNF) of a plurality of PNFs comprising at least one radio unit (RU), a second request message that includes data representing a request to upload a PNF Descriptor (PNFD) for the PNF;
transmitting the generated second request message to the NFVO; and
receiving, from the NFVO, a second response message that includes data indicating that the PNFD upload was successful.

15. The computer-readable media of claim 14, wherein the NFVO is a component of an infrastructure management framework (IMFW).

16. The computer-readable media of claim 14, wherein the generated first request message that includes the request to upload the VNF package includes an identifier of a VNF.

17. The computer-readable media of claim 14, wherein one or more of (i) generating the first request message that includes the request to upload the VNF, or (ii) transmitting the generated first request message to the NFVO are performed using a service management and orchestration framework (SMOFW).

18. The computer-readable media of claim 14, the operations further comprising:
generating a third request message that includes data representing a request to update a network service descriptor (NSD) associated with the VNF packages and the PNFD that were previously uploaded;
transmitting, to the NFVO, the generated third request message; and
receiving, from the NFVO, a third response message that includes data indicating the NSD update was successful.

* * * * *